US010841143B2

(12) United States Patent
Bai et al.

(10) Patent No.: US 10,841,143 B2
(45) Date of Patent: Nov. 17, 2020

(54) PHASE TRACKING REFERENCE SIGNAL FOR SUB-SYMBOL PHASE TRACKING

(71) Applicant: QUALCOMM Incorporated, San Diego, CA (US)

(72) Inventors: Tianyang Bai, Bridgewater, NJ (US); Juergen Cezanne, Ocean Township, NJ (US); Sundar Subramanian, San Diego, CA (US); Junyi Li, Chester, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/215,196

(22) Filed: Dec. 10, 2018

(65) Prior Publication Data

US 2019/0182091 A1 Jun. 13, 2019

Related U.S. Application Data

(60) Provisional application No. 62/597,833, filed on Dec. 12, 2017.

(51) Int. Cl.
*H04L 12/28* (2006.01)
*H04L 27/26* (2006.01)
(Continued)

(52) U.S. Cl.
CPC ........ *H04L 27/2628* (2013.01); *G06F 17/141* (2013.01); *H04B 1/04* (2013.01);
(Continued)

(58) Field of Classification Search
None
See application file for complete search history.

(56) References Cited

U.S. PATENT DOCUMENTS 10,491,245 B2 * 11/2019 Qian .................. H03M 13/271
2014/0313912 A1 * 10/2014 Jongren .............. H04W 24/10
370/252
(Continued)

FOREIGN PATENT DOCUMENTS

WO WO-2016118929 A2 7/2016

OTHER PUBLICATIONS

International Search Report and Written Opinion—PCT/US2018/064917—ISA/EPO—dated Mar. 20, 2019.
(Continued)

*Primary Examiner* — Elisabeth Benoit Magloire
(74) *Attorney, Agent, or Firm* — Holland & Hart LLP

(57) ABSTRACT

Methods, systems, and devices for wireless communications are described for phase error estimation and correction with sub-symbol resolution. A transmitting device may precode symbols (e.g., phase tracking reference signal (PT-RS) symbols) using a discrete Fourier transform (DFT). The transmitting device may map the DFT-precoded symbols to sets of adjacent subcarriers of a wireless signal, and may map other symbols to other subcarriers of the wireless signal. A receiving device may receive the wireless signal and may compare time domain representations of the DFT-precoded symbols with time domain representations of known reference symbols. The receiving device may estimate a phase error with sub-symbol resolution in the time domain based at least in part on the comparison, and may apply a phase correction in either the time or frequency domain to the other symbols.

30 Claims, 14 Drawing Sheets

(51) Int. Cl.
*G06F 17/14* (2006.01)
*H04B 1/16* (2006.01)
*H04B 1/04* (2006.01)
*H04B 1/40* (2015.01)

(52) U.S. Cl.
CPC ............... *H04B 1/16* (2013.01); *H04B 1/40* (2013.01); *H04L 27/2613* (2013.01); *H04L 27/2636* (2013.01)

(56) References Cited

U.S. PATENT DOCUMENTS

| | | | |
|---|---|---|---|
| 2016/0164580 A1* | 6/2016 | El-Najjar | H04B 7/0413 375/267 |
| 2017/0126458 A1* | 5/2017 | Shattil | H04W 52/241 |
| 2017/0331577 A1* | 11/2017 | Parkvall | H04L 5/0053 |
| 2017/0331670 A1* | 11/2017 | Parkvall | H04J 11/0056 |
| 2018/0091350 A1* | 3/2018 | Akkarakaran | G01S 13/346 |
| 2018/0198667 A1* | 7/2018 | He | H04B 1/38 |
| 2018/0205528 A1* | 7/2018 | Bai | H04W 72/0453 |
| 2018/0212809 A1* | 7/2018 | Bakulin | H04L 27/2636 |
| 2020/0008228 A1* | 1/2020 | Lee | H04L 5/001 |

OTHER PUBLICATIONS

Kuch K., et al., "Partial Response DFT-Precoded-OFDM Modulation", Internet Citation, May 10, 2012 (May 10, 2012), XP002718527, pp. 632-645,Retrieved from the Internet: URL:http://onlinelibrary.wiley.com/doi/10.1002/ett.2518/pdf [retrieved on Jan. 10, 2014].

Sohl A., et al., "Semiblind Channel Estimation for IFDMA in Case of Channels with Large Delay Spreads", EURASIP Journal on Advances in Signal Processing, Jan. 1, 2011 (Jan. 1, 2011), pp. 1-17, XP055568041, Cham DOI:10.1155/2011/857859, Retrieved from the Internet: URL:https://pdfs.semanticscholar.org/edec/492562d290f0d97215610473a5e12ce042d0.pdf.

Wahls S., et al., "Early Real-Time Experiments and Field Trial Measurements with 3GPP-LTE Air Interface Implemented on Reconfigurable Hardware Platform : 3GPP LTE Radio and Cellular Technology" In: "Early Real-Time Experiments and Field Trial Measurements with 3GPP-LTE Air Interface Implemented on Reconfigurable Hardware Platform : 3GPP LTE Radio and Cellular Technology", Apr. 23, 2009 (Apr. 23, 2009), Auerbach Publications, XP055567763, ISSN: 2155-515X, ISBN: 978-1-4200-1345-0 vol. 0, pp. 365-411, DOI: 10.1201/9781420072112.ch11.

* cited by examiner

US 10,841,143 B2

PHASE TRACKING REFERENCE SIGNAL FOR SUB-SYMBOL PHASE TRACKING

CROSS REFERENCES

The present application for patent claims the benefit of U.S. Provisional Patent Application No. 62/597,833 by BAI, et al., entitled "PHASE TRACKING REFERENCE SIGNAL FOR SUB-SYMBOL PHASE TRACKING," filed Dec. 12, 2017, assigned to the assignee hereof, and expressly incorporated herein.

BACKGROUND

The following relates generally to wireless communication, and more specifically to phase tracking reference signal for sub-symbol phase tracking.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support a phase tracking reference signal for sub-symbol phase tracking. Generally, the described techniques provide for phase error estimation and correction with sub-symbol resolution.

A transmitting device, such as a base station, may use a discrete Fourier transform (DFT) to precode one or more sets of symbols and may map the resulting sets of DFT-precoded symbols to corresponding sets of subcarriers that are adjacent in frequency. The transmitting device may also frequency division multiplex the DFT-precoded symbols with other symbols (e.g., non-DFT-precoded symbols) by mapping the other symbols to other subcarriers. A user equipment (UE) (or other receiving device, such as another base station) may receive a wireless signal that includes the subcarriers, and thus may receive the DFT-precoded symbols as well as the other symbols. The UE may estimate a phase error based at least in part on the DFT-precoded symbols. For example, the UE may estimate the phase error based at least in part on a comparison of time domain representations of the DFT-precoded symbols with time domain representations of corresponding reference symbols, which may support phase error estimation with sub-symbol resolution in the time domain. The UE may apply a phase error correction to the other symbols based at least in part on the estimated phase error. In some cases, the DFT-precoded symbols may be phase tracking reference signal (PT-RS) symbols.

A method of wireless communication is described. The method may include determining a DFT configuration for a plurality of symbols, generating, based at least in part on the DFT configuration, a plurality of DFT-precoded symbols corresponding to the plurality of symbols, mapping the plurality of DFT-precoded symbols to a corresponding plurality of subcarriers, the plurality of subcarriers including at least a subset of subcarriers that are adjacent in frequency, mapping additional symbols to additional subcarriers, and transmitting the plurality of DFT-precoded symbols via a wireless signal that includes the plurality of subcarriers and the additional subcarriers.

An apparatus for wireless communication is described. The apparatus may include means for determining a DFT configuration for a plurality of symbols, means for generating, based at least in part on the DFT configuration, a plurality of DFT-precoded symbols corresponding to the plurality of symbols, means for mapping the plurality of DFT-precoded symbols to a corresponding plurality of subcarriers, the plurality of subcarriers including at least a subset of subcarriers that are adjacent in frequency, means for mapping additional symbols to additional subcarriers, and means for transmitting the plurality of DFT-precoded symbols via a wireless signal that includes the plurality of subcarriers and the additional subcarriers.

Another apparatus for wireless communication is described. The apparatus may include a processor, memory in electronic communication with the processor, and instructions stored in the memory. The instructions may be operable to cause the processor to determine a DFT configuration for a plurality of symbols, generate, based at least in part on the DFT configuration, a plurality of DFT-precoded symbols corresponding to the plurality of symbols, map the plurality of DFT-precoded symbols to a corresponding plurality of subcarriers, the plurality of subcarriers including at least a subset of subcarriers that are adjacent in frequency, map additional symbols to additional subcarriers, and transmit the plurality of DFT-precoded symbols via a wireless signal that includes the plurality of subcarriers and the additional subcarriers.

A non-transitory computer-readable medium for wireless communication is described. The non-transitory computer-readable medium may include instructions operable to cause a processor to determine a DFT configuration for a plurality of symbols, generate, based at least in part on the DFT configuration, a plurality of DFT-precoded symbols corresponding to the plurality of symbols, map the plurality of DFT-precoded symbols to a corresponding plurality of subcarriers, the plurality of subcarriers including at least a subset of subcarriers that are adjacent in frequency, map additional symbols to additional subcarriers, and transmit the plurality of DFT-precoded symbols via a wireless signal that includes the plurality of subcarriers and the additional subcarriers.

Some examples of the method, apparatus, and non-transitory computer-readable medium described above may further include processes, features, means, or instructions for mapping at least one of the additional symbols to a subcarrier within the wireless signal that may be interposed in frequency between two of the plurality of subcarriers.

In some examples of the method, apparatus, and non-transitory computer-readable medium described above, generating the plurality of DFT-precoded symbols comprises generating a first subset of the plurality of DFT-precoded symbols using a first DFT precoding unit.

In some examples of the method, apparatus, and non-transitory computer-readable medium described above, mapping the plurality of DFT-precoded symbols to the plurality of subcarriers comprises mapping the first subset of the plurality of DFT-precoded symbols to the subset of subcarriers that may be adjacent in frequency.

In some examples of the method, apparatus, and non-transitory computer-readable medium described above, mapping the plurality of DFT-precoded symbols to the plurality of subcarriers comprises mapping subsets of the plurality of DFT-precoded symbols to respective subsets of the plurality of subcarriers, wherein each subset of the plurality of DFT-precoded symbols may be associated with a respective DFT precoding unit, and wherein each respective subset of the plurality of subcarriers comprises subcarriers that may be adjacent in frequency.

In some examples of the method, apparatus, and non-transitory computer-readable medium described above, generating the plurality of DFT-precoded symbols comprises accessing a lookup table that associates the plurality of symbols with the plurality of DFT-precoded symbols based at least in part on the DFT configuration. Some examples of the method, apparatus, and non-transitory computer-readable medium described above may further include processes, features, means, or instructions for retrieving the plurality of DFT-precoded symbols from memory.

Some examples of the method, apparatus, and non-transitory computer-readable medium described above may further include processes, features, means, or instructions for receiving, from a wireless device, channel quality information or signals to assist in determining channel quality information. Some examples of the method, apparatus, and non-transitory computer-readable medium described above may further include processes, features, means, or instructions for determining, based at least in part on the channel quality information, at least one of the plurality of subcarriers.

In some examples of the method, apparatus, and non-transitory computer-readable medium described above, the channel quality information comprises a signal-to-noise ratio (SNR) for at least one of the plurality of subcarriers.

Some examples of the method, apparatus, and non-transitory computer-readable medium described above may further include processes, features, means, or instructions for receiving, from a wireless device, an indication of one or more preferred subcarriers. Some examples of the method, apparatus, and non-transitory computer-readable medium described above may further include processes, features, means, or instructions for determining, based at least in part on the indication, at least one of the plurality of subcarriers.

In some examples of the method, apparatus, and non-transitory computer-readable medium described above, determining the DFT configuration comprises determining a number of DFT precoding units and a size of each DFT precoding unit.

In some examples of the method, apparatus, and non-transitory computer-readable medium described above, determining the DFT configuration comprises determining the DFT configuration based at least in part on a modulation and coding scheme (MCS), an SNR of at least one of the plurality of subcarriers, a phase noise associated with at least one of the plurality of subcarriers, a carrier frequency offset (CFO) associated with at least one of the plurality of subcarriers, or any combination thereof.

Some examples of the method, apparatus, and non-transitory computer-readable medium described above may further include processes, features, means, or instructions for transmitting an indication of the DFT configuration, an indication of the plurality of subcarriers, or any combination thereof.

In some examples of the method, apparatus, and non-transitory computer-readable medium described above, the plurality of symbols comprises a plurality of PT-RS symbols.

In some examples of the method, apparatus, and non-transitory computer-readable medium described above, each of the plurality of PT-RS symbols corresponds to a distinct PT-RS sequence.

A method of wireless communication is described. The method may include identifying a DFT configuration for a plurality of DFT-precoded symbols, receiving the plurality of DFT-precoded symbols via a corresponding plurality of subcarriers within a wireless signal and additional symbols via additional subcarriers within the wireless signal, the plurality of subcarriers including at least a subset of subcarriers that are adjacent in frequency, estimating a phase error based at least in part on the plurality of DFT-precoded symbols and the DFT configuration, and applying a phase correction based at least in part on the phase error to the additional symbols.

An apparatus for wireless communication is described. The apparatus may include means for identifying a DFT configuration for a plurality of DFT-precoded symbols, means for receiving the plurality of DFT-precoded symbols via a corresponding plurality of subcarriers within a wireless signal and additional symbols via additional subcarriers within the wireless signal, the plurality of subcarriers including at least a subset of subcarriers that are adjacent in frequency, means for estimating a phase error based at least in part on the plurality of DFT-precoded symbols and the DFT configuration, and means for applying a phase correction based at least in part on the phase error to the additional symbols.

Another apparatus for wireless communication is described. The apparatus may include a processor, memory in electronic communication with the processor, and instructions stored in the memory. The instructions may be operable to cause the processor to identify a DFT configuration for a plurality of DFT-precoded symbols, receive the plurality of DFT-precoded symbols via a corresponding plurality of subcarriers within a wireless signal and additional symbols via additional subcarriers within the wireless signal, the plurality of subcarriers including at least a subset of subcarriers that are adjacent in frequency, estimate a phase error based at least in part on the plurality of DFT-precoded symbols and the DFT configuration, and apply a phase correction based at least in part on the phase error to the additional symbols.

A non-transitory computer-readable medium for wireless communication is described. The non-transitory computer-readable medium may include instructions operable to cause a processor to identify a DFT configuration for a plurality of DFT-precoded symbols, receive the plurality of DFT-precoded symbols via a corresponding plurality of subcarriers within a wireless signal and additional symbols via additional subcarriers within the wireless signal, the plurality of subcarriers including at least a subset of subcarriers that are adjacent in frequency, estimate a phase error based at least in part on the plurality of DFT-precoded symbols and the DFT configuration, and apply a phase correction based at least in part on the phase error to the additional symbols.

Some examples of the method, apparatus, and non-transitory computer-readable medium described above may further include processes, features, means, or instructions for processing the plurality of DFT-precoded symbols based at least in part on the DFT configuration to obtain a corresponding plurality of symbols.

In some examples of the method, apparatus, and non-transitory computer-readable medium described above, estimating the phase error comprises comparing the plurality of symbols to a corresponding plurality of reference symbols in the time domain.

Some examples of the method, apparatus, and non-transitory computer-readable medium described above may further include processes, features, means, or instructions for receiving an indication of the plurality of reference symbols.

In some examples of the method, apparatus, and non-transitory computer-readable medium described above, estimating the phase error further comprises computing a phase error trajectory for at least one of the plurality of subcarriers.

In some examples of the method, apparatus, and non-transitory computer-readable medium described above, processing the plurality of DFT-precoded symbols comprises applying an inverse DFT (IDFT) to the plurality of DFT-precoded symbols.

In some examples of the method, apparatus, and non-transitory computer-readable medium described above, processing the plurality of DFT-precoded symbols comprises accessing a lookup table that associates the plurality of symbols with the plurality of DFT-precoded symbols based at least in part on the DFT configuration. Some examples of the method, apparatus, and non-transitory computer-readable medium described above may further include processes, features, means, or instructions for retrieving the plurality of symbols from memory.

Some examples of the method, apparatus, and non-transitory computer-readable medium described above may further include processes, features, means, or instructions for transmitting an indication of a preferred subcarrier.

Some examples of the method, apparatus, and non-transitory computer-readable medium described above may further include processes, features, means, or instructions for determining the preferred subcarrier based at least in part on an SNR.

Some examples of the method, apparatus, and non-transitory computer-readable medium described above may further include processes, features, means, or instructions for transmitting an indication of a preferred DFT configuration.

In some examples of the method, apparatus, and non-transitory computer-readable medium described above, identifying the DFT configuration comprises receiving an indication of a number of DFT precoding units and a size of each DFT precoding unit.

Some examples of the method, apparatus, and non-transitory computer-readable medium described above may further include processes, features, means, or instructions for receiving an indication of the plurality of subcarriers.

Some examples of the method, apparatus, and non-transitory computer-readable medium described above may further include processes, features, means, or instructions for applying the phase correction occurs in either the time domain or the frequency domain.

Some examples of the method, apparatus, and non-transitory computer-readable medium described above may further include processes, features, means, or instructions for receiving at least one of the additional symbols via a subcarrier within the wireless signal that may be interposed in frequency between two of the plurality of subcarriers.

In some examples of the method, apparatus, and non-transitory computer-readable medium described above, receiving the plurality of DFT-precoded symbols comprises receiving subsets of the plurality of DFT-precoded symbols via respective subsets of the plurality of subcarriers, each subset of the plurality of DFT-precoded symbols associated with a respective DFT precoding unit, and each respective subset of the plurality of subcarriers comprising subcarriers that may be adjacent in frequency.

In some examples of the method, apparatus, and non-transitory computer-readable medium described above, the plurality of symbols comprises a plurality of PT-RS symbols.

In some examples of the method, apparatus, and non-transitory computer-readable medium described above, each of the plurality of DFT-precoded PT-RS symbols corresponds to a distinct PT-RS sequence.

DETAILED DESCRIPTION

Figure 1:
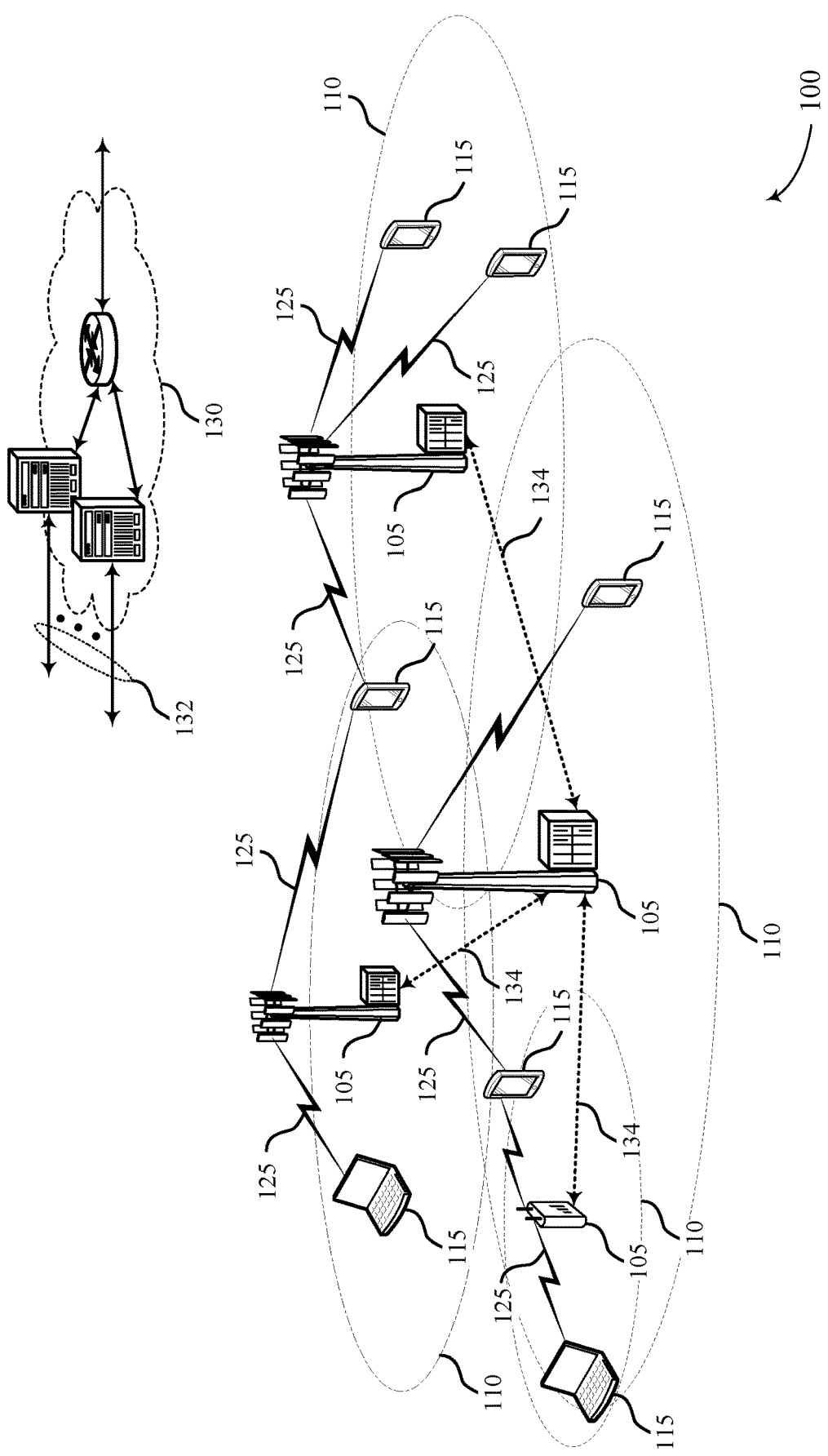
FIG. 1 illustrates an example of a system for wireless communication that supports a phase tracking reference signal (PT-RS) for sub-symbol phase tracking in accordance with aspects of the present disclosure.

Devices in a wireless communications system, such as base stations and UEs, may communicate using electromagnetic waves of various frequencies. A transmitting device, such as a base station or UE, may modulate one or more waveforms according to a modulation scheme, and a modulated waveform may be divided into time units known as symbol durations. Some modulation schemes (e.g., phase shift keying (PSK) or quadrature amplitude modulation (QAM) schemes) may represent information based at least in part on a phase of the modulated waveform (e.g., the phase of the waveform, or the phase and amplitude of the waveform), where the characteristics of a modulated waveform during a symbol duration may be referred to as a symbol (or modulation symbol).

Phase errors may arise, however, due to a variety of factors. For example, phase errors may arise due to rapid, random fluctuations in the phase of a waveform, which be referred to as phase noise. In some cases, phase noise may be caused by jitter in an oscillator at either a transmitter or a receiver. The power of a phase noise component of a waveform, and thus the impact of phase noise, may increase as the frequency of a waveform increases. As another example, phase errors may arise due to carrier frequency offset (CFO), which may in some cases be caused by frequency mismatch between an oscillator at a receiver and an oscillator at a transmitter. And as another example, phase errors may arise due to the Doppler effect, as a receiver and a transmitter may move relative to one another. The impact of phase errors may increase as the order of modulation increases, as the phase difference between distinct modulation symbols may become finer (that is, may decrease).

As described herein, wireless devices, such as base stations and UEs, may support techniques for identifying and correcting phase errors at a receiving device. A base station may use a discrete Fourier transform (DFT) to precode a set of symbols, may frequency division multiplex the DFT-precoded symbols with other symbols (e.g., non-DFT-precoded symbols), and may transmit the frequency division multiplexed symbols to a UE via a wireless signal. At least some of the DFT-precoded symbols may be mapped to adjacent subcarriers (that is, adjacent frequency tones) within the wireless signal. A UE (or other receiving device, such as another base station) may receive the wireless signal and may estimate a phase error based at least in part on the DFT-precoded symbols. In some cases, the DFT-precoded symbols may be carried by adjacent subcarriers, and the UE may estimate the phase error based at least in part on a comparison of time domain representations of the DFT-precoded symbols with time domain representations of corresponding reference symbols, which may support phase error estimation with sub-symbol resolution. The UE may apply a phase error correction to the other symbols based at least in part on the estimated phase error. In some cases, the DFT-precoded symbols may be phase tracking reference signal (PT-RS) symbols.

Aspects of the disclosure are initially described in the context of a wireless communications system. Aspects of the disclosure are further illustrated by and described with reference to apparatus diagrams, system diagrams, and flowcharts that relate to phase tracking reference signal for sub-symbol phase tracking.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $Tf=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 or UE 115 may modulate a digital signal by modifying one or more properties of a periodic waveform (e.g., frequency, amplitude, phase, etc.) prior to transmitting to a receiving device. For example, a BPSK modulation scheme may convey information by alternating between waveforms that are transmitted with no phase offset or with a 180° offset, and each symbol may convey a single bit of information.

In a QAM modulation scheme, two waveforms (known as the in-phase component (I) and the quadrature component (Q)) may be transmitted with a phase offset of 90°, and during a symbol duration, each the I and Q components may each be transmitted with a specific amplitude selected from a finite set. The amplitude combinations of the I and Q components may be represented in a graph known as a constellation map, where the amplitude of the I component is represented on the horizontal axis, the Q component is represented on the vertical axis, and each point in the constellation corresponds to a valid QAM symbol.

Each valid QAM symbol may also be considered as a combination of the I and Q components, with each point in the constellation corresponding to a valid phase and amplitude combination for the combined signal. The number of valid phase and amplitude combinations may determine the number of bits that are conveyed by each QAM symbol. For example, a 16QAM modulation scheme may define sixteen (16) valid phase and amplitude combinations, and thus each 16QAM symbol may represent four (4) bits, as $2^4$ is 16. Similarly, a 64QAM modulation scheme may define sixteen (64) valid phase and amplitude combinations, and thus each 64QAM symbol may represent six (6) bits, as $2^6$ is 64. The more number of bits represented by a single symbol, the higher the order of the modulation scheme or symbol. Wireless communications system 100 may in some cases use QAM modulation schemes higher in order than 16QAM or 64QAM, such as 256QAM and 1024QAM. As the order of a QAM modulation scheme increases, valid phase and amplitude combinations may be separated by finer (that is, smaller) phase differences, and thus the detrimental impact of phase errors may increase.

Base stations 105 and UEs 115 may support the techniques described herein for identifying and correcting phase errors at a receiving device, including on a sub-symbol level time scale, which may improve the ability of base stations 105 and UEs 115 to use higher-order modulation techniques. Thus, by improving the ability of base stations 105 and UEs 115 to represent more information (that is, a greater number of bits) with each symbol, the systems and techniques described herein may improve the efficiency with which a wireless communications system 100 utilizes spectrum, power, frequency, time, code, and other resources.

Figure 2:
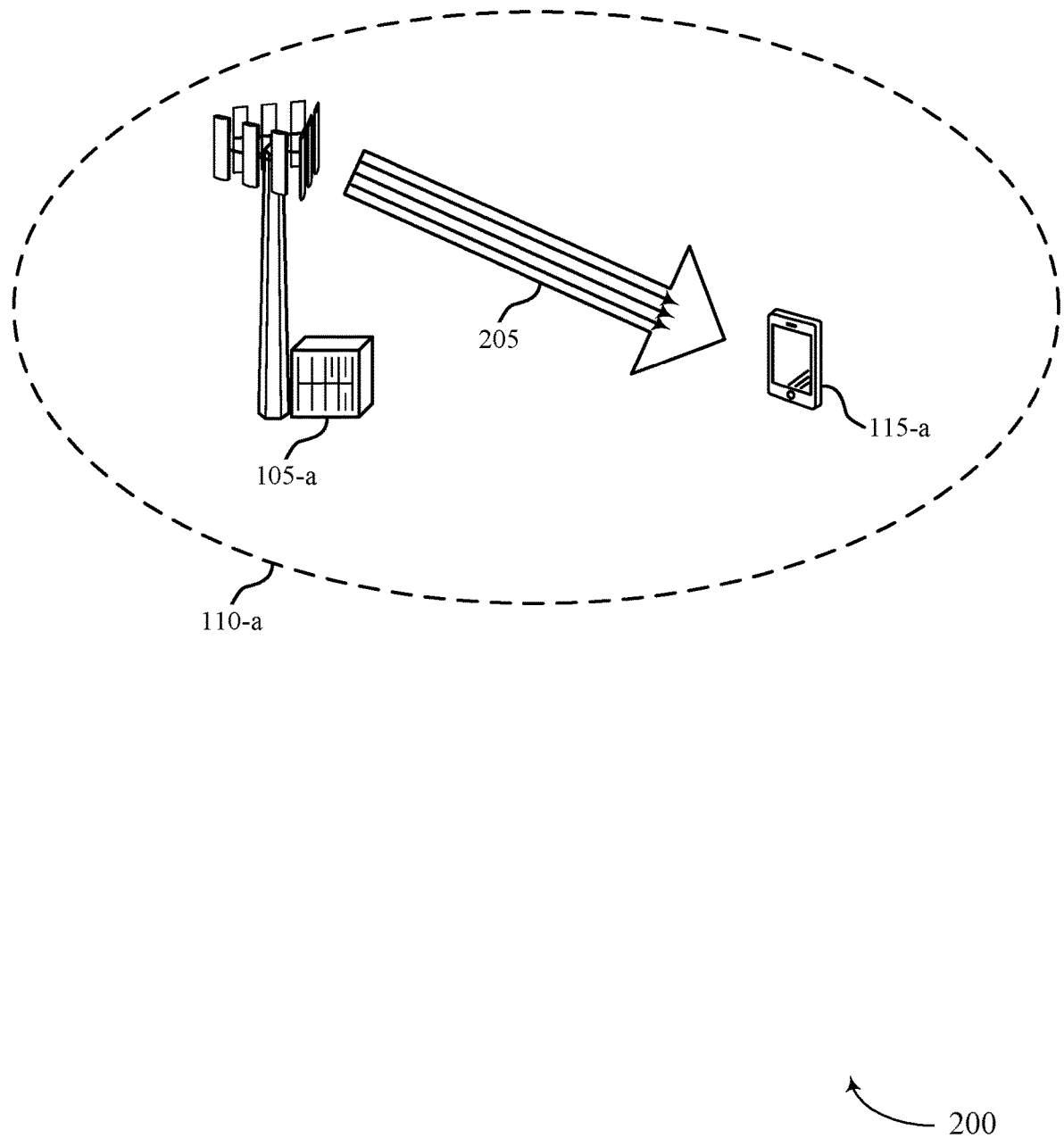
FIG. 2 illustrates an example of a system for wireless communication that supports a PT-RS for sub-symbol phase tracking in accordance with aspects of the present disclosure.

FIG. 2 illustrates an example of a wireless communications system 200 that supports a PT-RS for sub-symbol phase tracking in accordance with various aspects of the present disclosure. In some examples, wireless communications system 200 may include aspects of wireless communications system 100. For example, wireless communications system includes a base station 105-a and a UE 115-a, which may be examples of a base station 105 and a UE 115 as described with reference to FIG. 1.

The base station 105-a may transmit to the UE 115-a a wireless signal 205 that includes a number of subcarriers, each subcarrier having a different frequency. The base station 105-a may frequency multiplex symbols by mapping the symbols to different subcarriers with the wireless signal 205. Each of the subcarriers may be modulated using various modulation schemes such as QAM, PSK, etc. However, phase errors may arise due to a variety of factors. These factors may include phase noise, carrier frequency offset, Doppler effect. The impact of phase errors may increase as the order of modulation increases, which may impact the performance of a wireless system. Techniques to address identifying and correcting phase errors at wireless devices are described herein.

In some cases, the base station 105-a and the UE 115-a may perform DFTs and inverse DFTs (IDFTs). A DFT may transform discrete time data sets into a discrete frequency representation, and an IDFT may transform a discrete frequency representation (e.g., information represented in discrete frequencies) into a discrete time representation (e.g., a digital signal carrying information in the time domain). In some cases, the base station 105-a may precode some symbols according to a DFT, then frequency division multiplex the DFT-precoded symbols with other symbols (e.g., non-DFT-precoded symbols) by mapping the DFT-precoded symbols and the other symbols to different subcarriers within the wireless signal 205. The other symbols may comprise data, control information, or reference information and thus may be referred to as data, control, or reference symbols.

The base station 105-a may map at least some of the DFT-precoded symbols to adjacent subcarriers (that is, adjacent frequency tones) within the wireless signal 205. Further, the base station 105 may use one or more size-M DFT modules (which may also be referred to as M-point DFT modules) to generate the DFT-precoded symbols. For example, the base station 105-a may use a single size-M DFT module to generate M DFT-precoded symbols, and may map the M DFT-precoded symbols to a single set of M adjacent subcarriers within the wireless signal 205 while mapping other symbols to other subcarriers within the wireless signal 205. As another example, the base station 105-a may use multiple size-M DFT modules to generate multiple sets of M DFT-precoded symbols, and may map each set of M DFT-precoded symbols to a respective set of M adjacent subcarriers, while mapping other symbols to other subcarriers within the wireless signal 205. The other subcarriers may in some cases be interposed between sets of M adjacent subcarriers. Thus, the number of DFT modules used by the base station 105-a to generate DFT-precoded symbols may vary, as may the size of each DFT module. In some cases, the DFT-precoded symbols may be PT-RS symbols. For example, the DFT-precoded symbols may be PT-RS symbols that each correspond to a distinct PT-RS sequence.

The UE 115 may receive the wireless signal and may estimate a phase error based at least in part on the DFT-precoded symbols. In some cases, the UE 115 may estimate the phase error with sub-symbol resolution based at least in part on the DFT-precoded symbols carried by adjacent subcarriers. The UE 115 may then apply a phase error correction to the other symbols based at least in part on the estimated phase error. In some cases, the UE 115 may estimate the phase error, at least in part, by performing an IDFT of the DFT-precoded symbols to obtain a time domain representation of the DFT-precoded symbols and comparing the time domain representation of the DFT-precoded symbols with a time domain representation of a corresponding set of reference symbols (e.g., symbols of reference PT-RS sequences).

The resolution in the time domain with which the UE 115 may estimate the phase error may relate to the size 'M' of the one or more DFT modules used by base station 105 to precode the DFT-precoded symbols. For example, the UE 115 may estimate the phase error with a resolution of ¼ of a symbol in the time domain if the base station 105 uses one or more size-4 DFT modules (which may also be referred to as 4-point DFT modules), the UE 115 may estimate the phase error with a resolution of ⅛ of a symbol in the time domain if the base station 105 uses one or more size-8 DFT modules (which may also be referred to as 8-point DFT modules), and so on.

Figure 3:
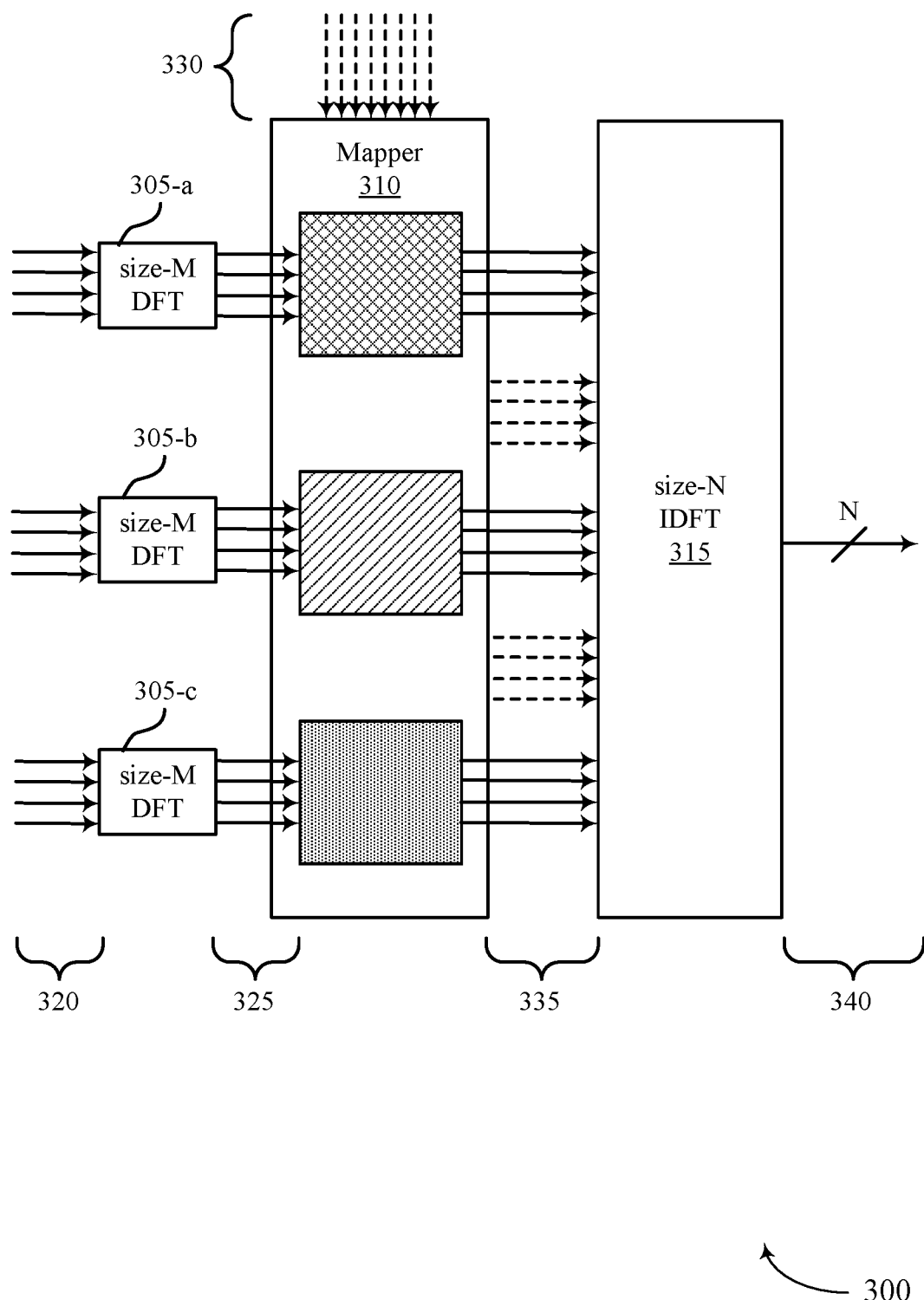
FIG. 3 illustrates an example of a discrete Fourier transform (DFT) precoding system that supports a PT-RS for sub-symbol phase tracking in accordance with aspects of the present disclosure.

FIG. 3 illustrates an example of a DFT-precoding system 300 that supports a PT-RS for sub-symbol phase tracking in accordance with various aspects of the present disclosure. In some examples, DFT-precoding system 300 may be included in aspects of wireless communications system 100 or wireless communications system 200. For example, DFT-precoding system 300 may be included in a base station 105. DFT-precoding system 300 may include one or more size-M DFT modules 305, a mapper 310, and a size-N IDFT module 315.

The base station 105 may determine a DFT configuration for DFT-precoding system 300, which may include determining the number and size of DFT modules 305. As illustrated in the example of FIG. 3, DFT-precoding system 300 includes three DFT modules 305, each size-4 as indicated by the four inputs and outputs of each DFT module 305 illustrated in FIG. 3, but the base station 105 may determine any number of DFT modules 305 of any size (e.g., any value of M) in other examples.

Each size-M DFT module 305 may receive M time domain symbols 320 and may generate and output M DFT-precoded symbols 325. The symbols 320 may in some cases be reference signal symbols, such as PT-RS symbols. For example, the M symbols 320 may respectively correspond to M distinct time domain PT-RS sequences, and thus each of the M symbols 320 may correspond to a distinct time domain PT-RS sequence. Each symbol 320, prior to any DFT-precoding, may be equal in magnitude to one another, and thus power for the purpose of phase tracking by a receiving device (e.g., a UE 115) may be equally distributed in the time domain across an individual symbol.

In some cases, the DFT modules 305 may generate DFT-precoded symbols 325 without executing DFT operations at the time of a transmission. For example, DFT-precoded symbols 325 may be generated for possible symbols 320 in advance and stored in memory within the base station 105. At the time of a given transmission, a DFT module 305 may generate DFT-precoded symbols 325 by retrieving from memory a plurality of DFT-precoded symbols 325 that have been computed in advance and associated with the symbols 320 and the operative DFT configuration. For example, the DFT modules 305 may access (or consult) a lookup table that associates pre-computed DFT-precoded symbols 325 with the symbols 320 and the operative DFT configuration.

In some cases, the base station 105 may determine the DFT configuration for DFT-precoding system 300 based at least in part on the total number of symbols 320. For example, if the total number of symbols is 'X,' and the total number of DFT modules is 'Y,' the base station 105 may determine Y and M such that Y multiplied by M equals X (that is, Y*M=X). The base station 105 may also determine Y and M based at least in part on a desired resolution for phase tracking and phase error estimation and also on noise and fading considerations. For example, a larger value of M may correspond to enhanced resolution for phase tracking and phase error estimation (e.g., M=4 may support phase tracking and phase error estimation in the time domain with a resolution of ¼ of a symbol period, M=8 may support phase tracking and phase error estimation in the time domain with a resolution of ⅛ of a symbol period, and so on). On the other hand, a smaller value of M—and thus a larger value of Y—may correspond to enhanced robustness to noise and frequency selective fading in a communications channel due to frequency diversity effects, as the use of more DFT modules 305 may allow at least some DFT-precoded symbols 325 to be separated from one another in frequency.

Accordingly, in some cases the DFT configuration may be variable, and the base station 105 may determine the DFT configuration based at least in part on factors related to characteristics of the subcarriers 335 to which the mapper 310 may map the DFT-precoded symbols 325. For example, the base station 105 may determine the DFT configuration based at least in part on one or more of a modulation and coding scheme (MCS), a signal-to-noise ratio (SNR), a phase noise, or a CFO associated with at least one of the subcarriers 335 to which the mapper 310 may map the DFT-precoded symbols 325. In some cases, the base station 105 may transmit to a target wireless device (e.g., a target UE 115) an indication of the DFT configuration used to generate a given set of DFT-precoded symbols 325. In some cases, the base station 105 may receive from a target wireless device (e.g., a target UE 115) an indication of a preferred DFT configuration, and the base station 105 may use the preferred DFT configuration to generate a given set of DFT-precoded symbols 325.

Mapper 310 may receive one or more sets of DFT-precoded symbols 325, each set of DFT-precoded symbols 325 corresponding to a distinct DFT module 305, and may map the sets of DFT-precoded symbols 325 to corresponding sets of adjacent subcarriers 335. The adjacent subcarriers 335 included in the corresponding sets of adjacent subcarriers 335 may be adjacent in frequency (e.g., may comprise adjacent tones). Thus, the mapper 310 may map any DFT-precoded symbols 325 generated by a given DFT module 305 to respective subcarriers 335 that are adjacent in frequency. Mapping M DFT-precoded symbols 325 to adjacent subcarriers 335 may beneficially support phase tracking and phase error estimation in the time domain with a resolution of 1/M of a symbol period, which may, for example, support the use of higher-order modulation techniques.

Mapper 310 may also receive one or more additional symbols 330, which may be in the frequency domain but not DFT-precoded (e.g., not processed by any DFT module 305). The additional symbols may be of any symbol type and may, for example, be data symbols, control symbols, or reference signal symbols representing data information, control information, or reference signal information. Mapper 310 may frequency division multiplex the additional symbols 330 with the DFT-precoded symbols 325. Thus, DFT-precoding system 300 may frequency division multiplex DFT-precoded symbols 325 with other symbols (data symbols, control symbols, or reference symbols) that are not DFT-precoded.

For example, if the DFT configuration comprises multiple DFT modules 305, as in the example of DFT-precoding system 300, mapper 310 may map at least one additional symbol 330 to a subcarrier 335 that is between two sets of adjacent subcarriers 335 to which the mapper 310 maps DFT-precoded symbols 325, as illustrated in FIG. 3. As another example, if the DFT configuration comprises only one DFT module 305, mapper 310 may map at least one additional symbol 330 to a subcarrier 335 that is adjacent in frequency to a subcarrier 335 to which the mapper 310 maps DFT-precoded symbols 325 (e.g., adjacent in frequency to one subcarrier 335 of a set of adjacent subcarriers 335 to which the mapper 310 maps DFT-precoded symbols 325). Mapper 310 may seek to distribute sets of adjacent subcarriers 335 to which mapper 310 maps DFT-precoded symbols 325 so as to support phase tracking and phase error estimation across the total bandwidth spanned by the subcarriers 335 and to enhance the frequency diversity of different sets of adjacent subcarriers 335 relative to one another.

In some cases, the mapper 310 may determine the subcarriers 335 to which the mapper 310 maps DFT-precoded symbols 325 based at least in part on channel quality considerations. For example, the mapper 310 may map DFT-precoded symbols 325 to subcarriers 335 having better channel quality (e.g., lower SNR) relative to other subcarriers 335, as this may enhance the ability of a target receiving device (e.g., a target UE 115) to perform phase tracking and phase error corrections. In some cases, the base station 105 may receive channel quality information (e.g., channel measurement reports) from another wireless device (e.g., the target receiving device or some other wireless device, such as another base station 105 or UE 115), and the mapper 310 may determine one or more of the subcarriers 335 to which the mapper 310 maps DFT-precoded symbols 325 based at least in part on the channel quality information received from the base station 105. Additionally or alternatively, the base station 105 may receive from another wireless device one or more signals (e.g., reference signals) based upon which the base station 105 may determine channel quality information, and the mapper 310 may determine one or more of the subcarriers 335 to which the mapper 310 maps DFT-precoded symbols 325 based at least in part on the channel quality information determined by the base station 105. Channel quality information received or determined by the base station 105 may include SNR information for one or more of the subcarriers 335.

Additionally or alternatively, the base station 105 may in some cases receive an indication of one or more preferred subcarriers 335 from another wireless device, and the mapper 310 may map one or more DFT-precoded symbols 325 to the one or more preferred subcarriers 335. Also, the base station 105 may transmit to a target wireless device (e.g., a target UE 115) an indication of the subcarriers 335 to which mapper 310 maps DFT-precoded symbols 325.

The mapper 310 may output the subcarriers 335 to which the mappers have mapped DFT-precoded symbols 325 and additional symbols 330 to the size-N IDFT module 315. N may be the number of subcarriers 335, and the size-N IDFT module may execute IDFT operations to transform the information mapped to the N subcarriers 335 into N corresponding discrete time domain representations 340 (e.g., digital signals carrying information in the time domain). Afterwards, the base station 105 may perform additional processing on the time domain representations 340 (e.g., serializing, such as parallel-to-serial conversion, prepending of a cyclic prefix to each time domain symbol, etc.) and may transmit a wireless signal that includes the subcarriers 335.

Although the operation of DFT-precoding system 300 has been described in the context of a single symbol duration, it is to be understood that the example of DFT-precoding system 300 and other examples in accordance with various aspects of the present disclosure may repeat during multiple consecutive or non-consecutive symbol durations.

Figure 4:
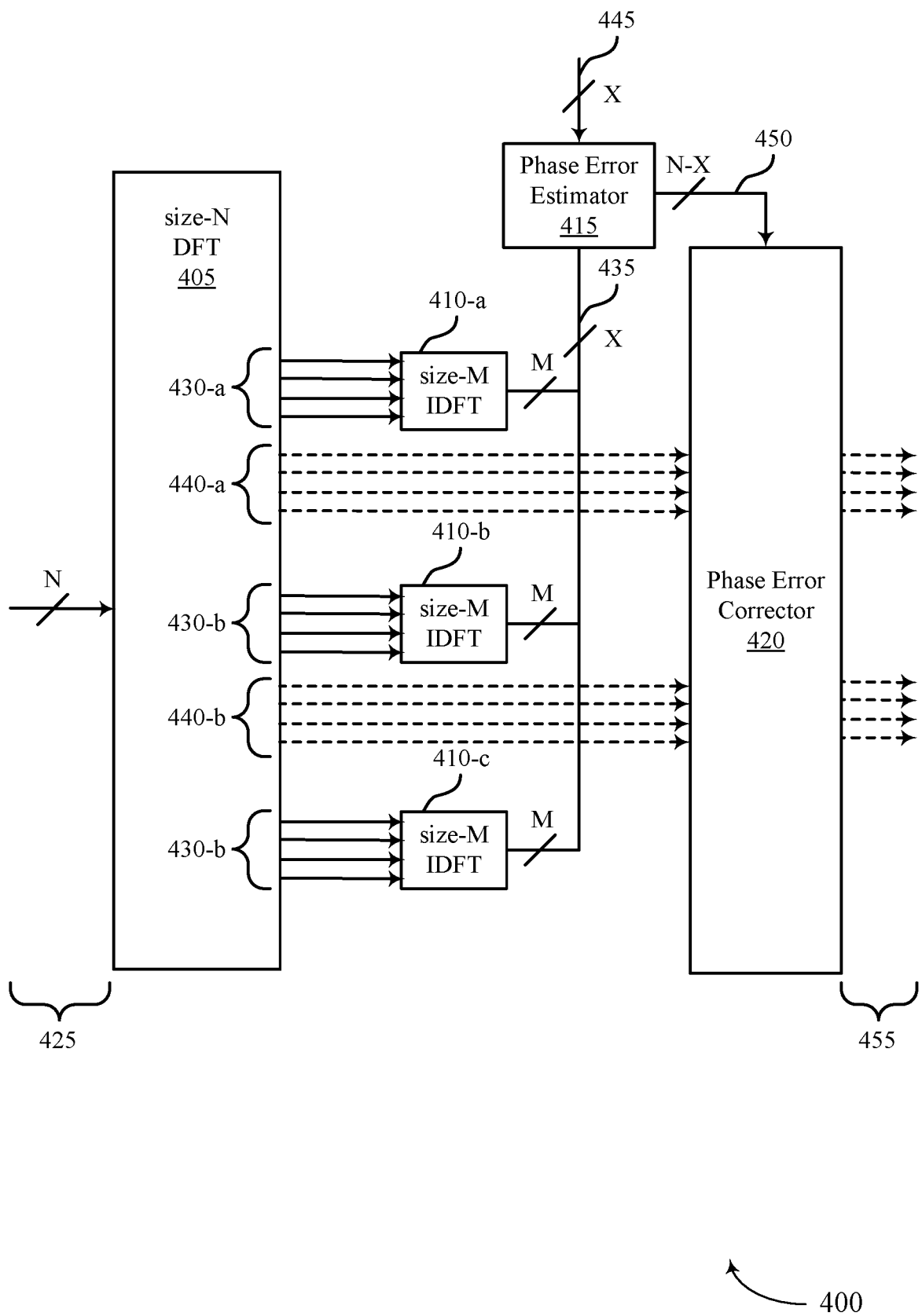
FIG. 4 illustrates an example of a phase error compensation system that supports a PT-RS for sub-symbol phase tracking in accordance with aspects of the present disclosure.

FIG. 4 illustrates an example of a phase error compensation system 400 that supports a PT-RS for sub-symbol phase tracking in accordance with various aspects of the present disclosure. In some examples, phase error compensation system 400 may be included in aspects of wireless communications system 100 or wireless communications system 200. For example, phase error compensation system 400 may be included in a UE 115. Phase error compensation system 400 may include a size-N DFT module 405, one or more size-M IDFT modules 410, a phase error estimator 415, and a phase error corrector 420.

The UE 115 may receive a wireless signal that includes a plurality of subcarriers 335 from a transmitting device (e.g., a base station 105). The wireless signal may have been processed by a DFT-precoding system 300 such as the example described in reference to FIG. 3. Thus, some of the received subcarriers 335 may carry DFT-precoded symbols 325 and some of the received subcarriers 335 may carry additional symbols 330 (e.g. symbols that were not DFT-precoded prior to transmission), and DFT-precoded symbols 325 may be multiplexed with additional symbols 330. Further, sets of DFT-precoded symbols generated by individual DFT modules 305 may be received via correspond sets of adjacent subcarriers 335.

The UE 115 may identify a DFT configuration for the DFT-precoded symbols. For example, the UE 115 may identify a number of DFT modules 305 used by the transmitting device to precode the DFT-precoded symbols and a size of each DFT module 305 used to precode the DFT-precoded symbols. In some cases, the UE 115 may receive from the transmitting device an indication of the DFT configuration. In some cases, the UE 115 or another wireless node (e.g., another UE 115 or a base station 105) may transmit to the transmitting device an indication of a preferred DFT configuration, and the transmitting device may be configured to use the preferred DFT configuration or to notify the UE 115 if it does or does not use the preferred DFT configuration.

The UE 115 may also identify the subcarriers 335 that carry the DFT-precoded symbols 325. In some cases, the UE 115 may receive from the transmitting device an indication of the subcarriers 335 that carry the DFT-precoded symbols 325. In some cases, the UE 115 or another wireless node may transmit to the transmitting device an indication of one or more preferred subcarriers 335 for DFT-precoded symbols 325, and the transmitting device may be configured to map the DFT-precoded symbols 325 to the preferred subcarriers 335 or to notify the UE 115 if it does or does not map the DFT-precoded symbols 325 to the preferred subcarriers 335. In some cases, the UE 115 may determine the preferred subcarriers 335 based at least in part on one or more associated channel quality metrics, such as SNR.

The UE 115 may perform some preliminary processing on the wireless signal (e.g., removal of cyclic prefixes, serial-to-parallel conversion, etc.), then process the DFT-precoded symbols 325 based at least in part on the identified DFT configuration to obtain a corresponding plurality of symbols. For example, the UE 115 may pass a plurality of time domain representations 425 of the received DFT-precoded symbols 325 and the received additional symbols 330 to the size-N DFT module, where N may be the number of received subcarriers 335. The size-N DFT module may generate N frequency domain representations corresponding to the N time domain representations 425. For example, the size-N DFT module may generate M frequency domain representations 430 of each set of M DFT-precoded symbols 325 corresponding to a DFT module 305 and may also generate a frequency domain representation 440 of each additional symbol 330.

The size-N DFT module may pass the M frequency domain representations 430 of each set of M DFT-precoded symbols 325 to a corresponding size-M IDFT module 410. The UE 115 may configure the number and size of the IDFT modules 410 based on the identified DFT configuration for the DFT-precoded symbols 325 (e.g., the UE 115 may configure the number and size of the IDFT modules 410 to match the number and size of the DFT modules 305 used to generate the DFT-precoded symbols 325). Each size-M IDFT module 410 may generate a set of M time domain symbols 435 corresponding to each set of M DFT-precoded symbols 325 based on an IDFT algorithm and may pass the time domain symbols 435 to the phase error estimator 415.

In some cases, the IDFT modules 410 may not execute IDFT operations at the time DFT-precoded symbols 325 are received. For example, time domain symbols 435 corresponding to the possible DFT-precoded symbols 325 may be generated in advance and stored in memory within the UE 115. At the time of a given transmission, an IDFT module 410 may generate the time domain symbols 435 by retrieving from memory a plurality of time domain symbols 435 that have been computed in advance and associated with the DFT-precoded symbols 325 and the operative DFT configuration. For example, the IDFT modules 410 may access (or consult) a lookup table that associates pre-computed time domain symbols 435 with DFT-precoded symbols 325 and the operative DFT configuration.

The phase error estimator 415 may receive X time domain symbols 435 (where X is the total number of DFT-precoded symbols 325, as described in reference to FIG. 3) and may estimate one or more phase errors based at least in part on the X time domain symbols 435. For example, the phase error estimator may retrieve from memory X reference symbols 445 and compare the X time domain symbols 435 to the X reference symbols 445 in the time domain. In some cases, the UE 115 may receive an indication from the transmitting device of the symbols 320 for which the DFT-precoded symbols 325 were generated and may retrieve from memory reference symbols 445 that correspond to the symbols 320 for which the DFT-precoded symbols 325 were generated. Alternatively or additionally, the UE 115 may receive an indication from the transmitting device of the reference symbols 445 to use for phase error estimation. In some cases, the plurality of DFT-precoded symbols 325 may correspond to a plurality of PT-RS symbols, and thus the time domain symbols 435 may be time domain versions of the received PT-RS symbols and the reference symbols 445 may be reference PT-RS symbols. In some cases, each reference PT-RS symbol may be part of a distinct PT-RS sequence, and the indication of the reference symbols 445 may indicate the corresponding PT-RS sequences.

By comparing the X time domain symbols 435 to the X reference symbols 445 in the time domain, where M DFT-precoded symbols 325 were received via adjacent subcarriers 335, the phase error estimator 415 may support phase tracking and phase error estimation in the time domain with a resolution of 1/M of a symbol period, which may, for example, support the use of higher-order modulation techniques.

Further, generating the DFT-precoded symbols 325, by the transmitting device, using a DFT-configuration and symbols 320 that are known to the UE 115 may further support phase tracing and phase error estimation by the UE. For example, because the UE 115 may know exactly which symbols 320 were DFT-precoded and the exact DFT configuration used to generate the corresponding DFT-precoded symbols, the UE 115 may be able to determine a corresponding configuration of IDFT modules 410 and a corresponding set of reference symbols 445, and thus may support the validity of the comparison of time domain symbols 435 to reference symbols 445 by the phase error estimator 415. Further, DFT-precoding of the DFT-precoded symbols 325 may ensure that power in the time domain is equally distributed within each of time domain symbols 435, thus further supporting the validity of the comparison of time domain symbols 435 to reference symbols 445 by the phase error estimator 415.

The phase error estimator 415 may in some cases compute a phase error trajectory based on the comparison of time domain symbols 435 to reference symbols 445. The phase error trajectory may comprise a trajectory of phase error across the bandwidth of the wireless signal (e.g., across the frequencies corresponding to the received subcarriers 335), as a phase error may be computed for multiple subcarriers via which DFT-precoded symbols 325 were received, and a phase error for one or more other subcarriers 335 at other frequencies may be extrapolated or interpolated therefrom, as applicable The phase error corrector 420 may apply a phase correction (e.g., a phase adjustment) to the frequency domain representation 440 of one or more of the additional symbols 330 based at least in part on the phase error computed by the phase error estimator. In some cases, the phase error corrector 420 may receive from the phase error estimator 415 a separate phase error estimate 450 corresponding to each additional symbol 330 (e.g., phase error corrector 420 may receive N-X phase error estimates 450 from the phase error estimator 415), and the phase error corrector 420 may apply a corresponding phase correction to the frequency domain representation 440 of each of the additional symbols 330, resulting in a phase-corrected representation 455 of each of the additional symbols 330. Further, although in the example of phase error compensation system 400 the phase error corrector 420 is shown as applying phase corrections in the frequency domain, in other examples, the phase error corrector 420 may apply phase corrections in the time domain. For example, the phase error corrector may apply phase corrections to time domain representations of the additional symbols 330.

Although the operation of phase error compensation system 400 has been described in the context of a single symbol duration, it is to be understood that the example of phase error compensation system 400 and other examples in accordance with various aspects of the present disclosure may repeat for during multiple consecutive or non-consecutive symbol durations.

Figure 5:
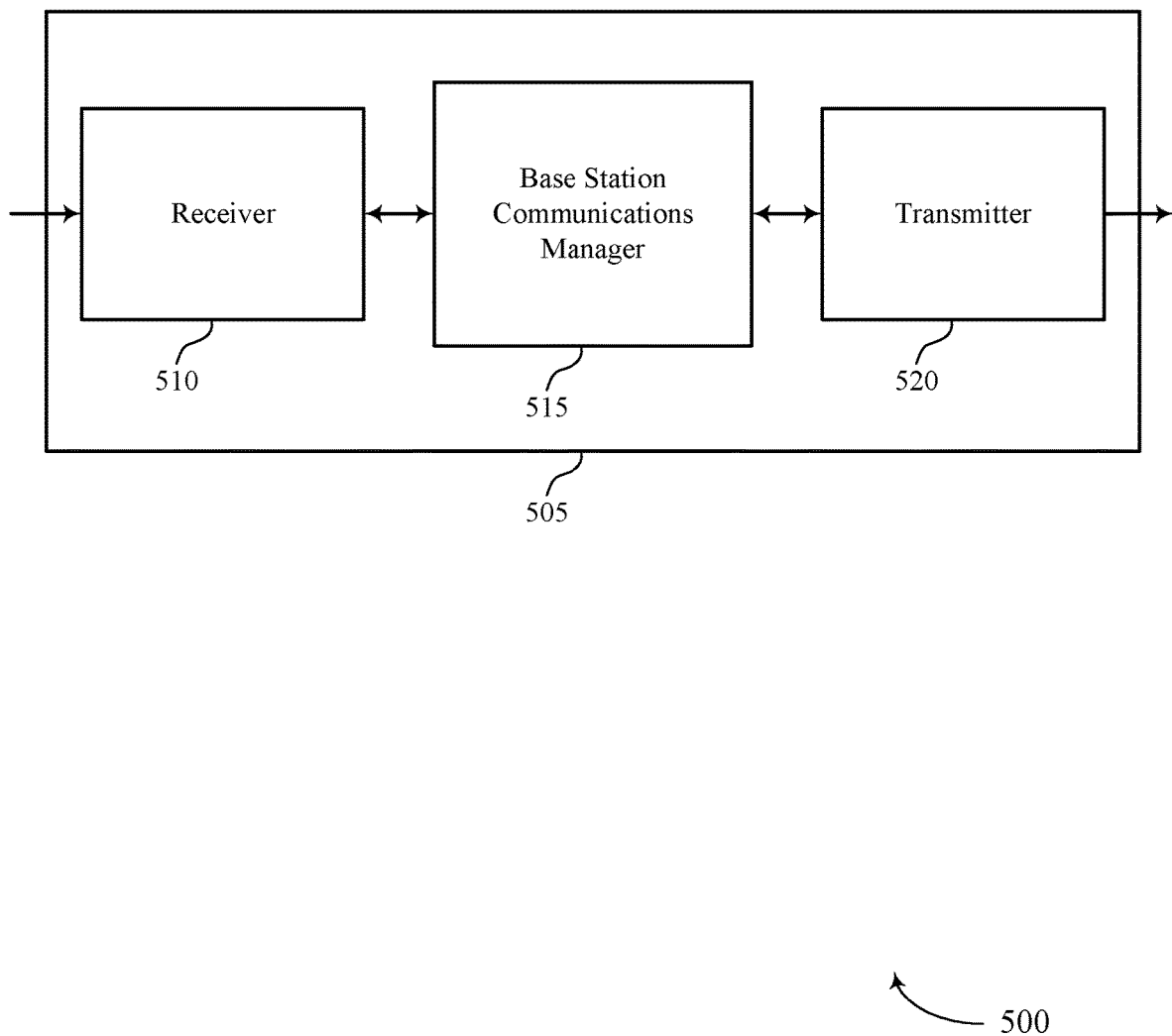
FIGS. 5 through 7 show block diagrams of a device that supports a PT-RS for sub-symbol phase tracking in accordance with aspects of the present disclosure.

FIG. 5 shows a block diagram 500 of a wireless device 505 that supports a PT-RS for sub-symbol phase tracking in accordance with aspects of the present disclosure. Wireless device 505 may be an example of aspects of a base station 105 as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to phase tracking reference signal for sub-symbol phase tracking, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8.

Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515 may determine a DFT configuration for a set of symbols, generate, based on the DFT configuration, a set of DFT-precoded symbols corresponding to the set of symbols, map the set of DFT-precoded symbols to a corresponding set of subcarriers, the set of subcarriers including at least a subset of subcarriers that are adjacent in frequency, map additional symbols to additional subcarriers, and transmit the set of DFT-precoded symbols via a wireless signal that includes the set of subcarriers and the additional subcarriers.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
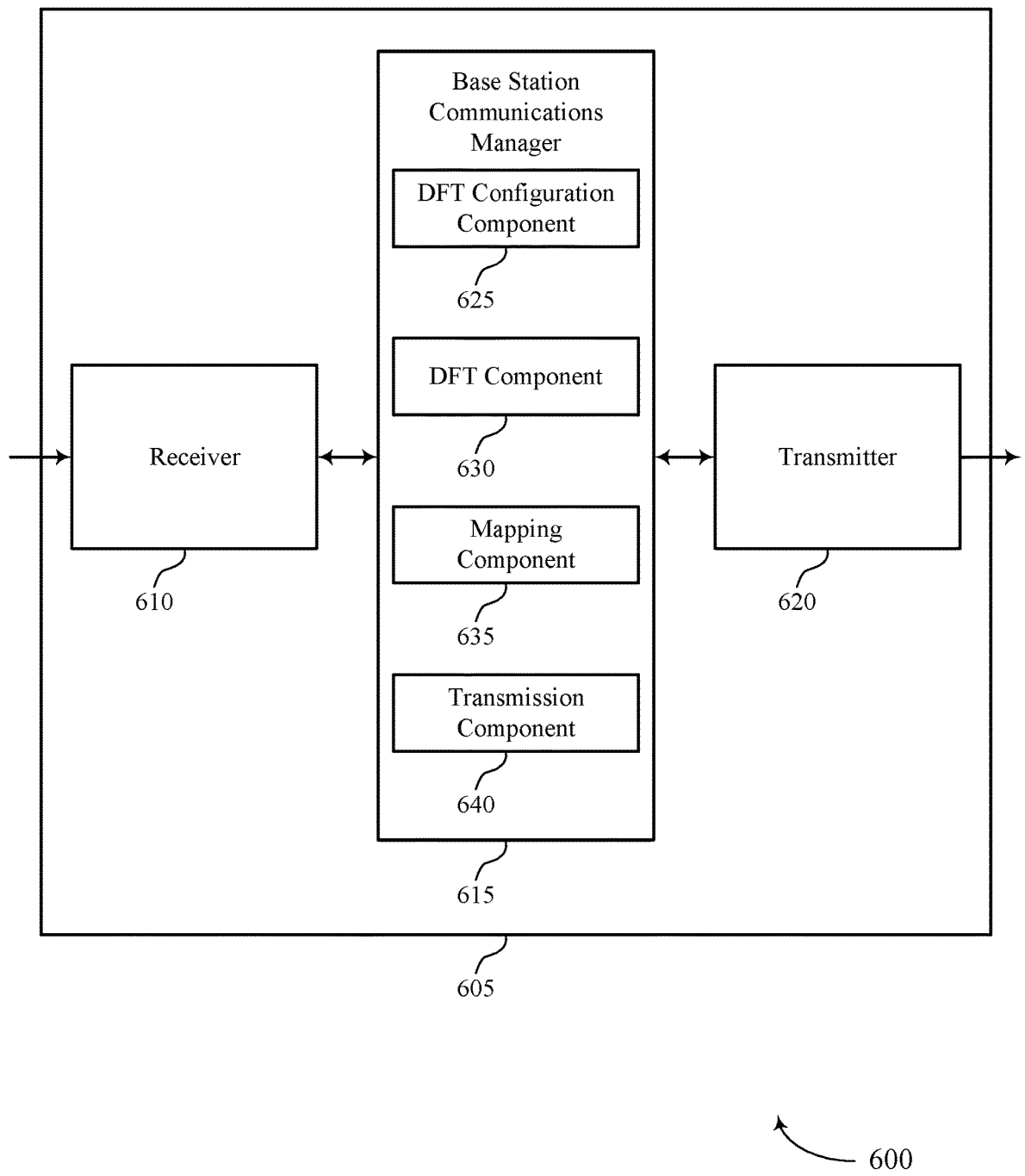

FIG. 6 shows a block diagram 600 of a wireless device 605 that supports a PT-RS for sub-symbol phase tracking in accordance with aspects of the present disclosure. Wireless device 605 may be an example of aspects of a wireless device 505 or a base station 105 as described with reference to FIG. 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to phase tracking reference signal for sub-symbol phase tracking, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8. Base station communications manager 615 may also include DFT configuration component 625, DFT component 630, mapping component 635, and transmission component 640.

DFT configuration component 625 may determine a DFT configuration for a set of symbols. In some cases, determining the DFT configuration includes determining a number of DFT precoding units and a size of each DFT precoding unit. In some cases, determining the DFT configuration includes determining the DFT configuration based on an MCS, an SNR of at least one of the set of subcarriers, a phase noise associated with at least one of the set of subcarriers, a CFO associated with at least one of the set of subcarriers, or any combination thereof.

DFT component 630 may generate, based on the DFT configuration, a set of DFT-precoded symbols corresponding to the set of symbols. In some cases, generating the set of DFT-precoded symbols includes generating a first subset of the set of DFT-precoded symbols using a first DFT precoding unit. In some cases, generating the set of DFT-precoded symbols includes accessing a lookup table that associates the set of symbols with the set of DFT-precoded symbols based on the DFT configuration, and retrieving the set of DFT-precoded symbols from memory.

Mapping component 635 may map the set of DFT-precoded symbols to a corresponding set of subcarriers, the set of subcarriers including at least a subset of subcarriers that are adjacent in frequency, and may map additional symbols to additional subcarriers. In some cases, mapping component 635 may map at least one of the additional symbols to a subcarrier within the wireless signal that is interposed in frequency between two of the set of subcarriers. In some cases, mapping the set of DFT-precoded symbols to the set of subcarriers includes mapping the first subset of the set of DFT-precoded symbols to the subset of subcarriers that are adjacent in frequency. In some cases, mapping the set of DFT-precoded symbols to the set of subcarriers includes mapping subsets of the set of DFT-precoded symbols to respective subsets of the set of subcarriers, where each subset of the set of DFT-precoded symbols is associated with a respective DFT precoding unit, and where each respective subset of the set of subcarriers includes subcarriers that are adjacent in frequency.

Transmission component 640 may cause transmitter 620 to transmit the set of DFT-precoded symbols via a wireless signal that includes the set of subcarriers and the additional subcarriers.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
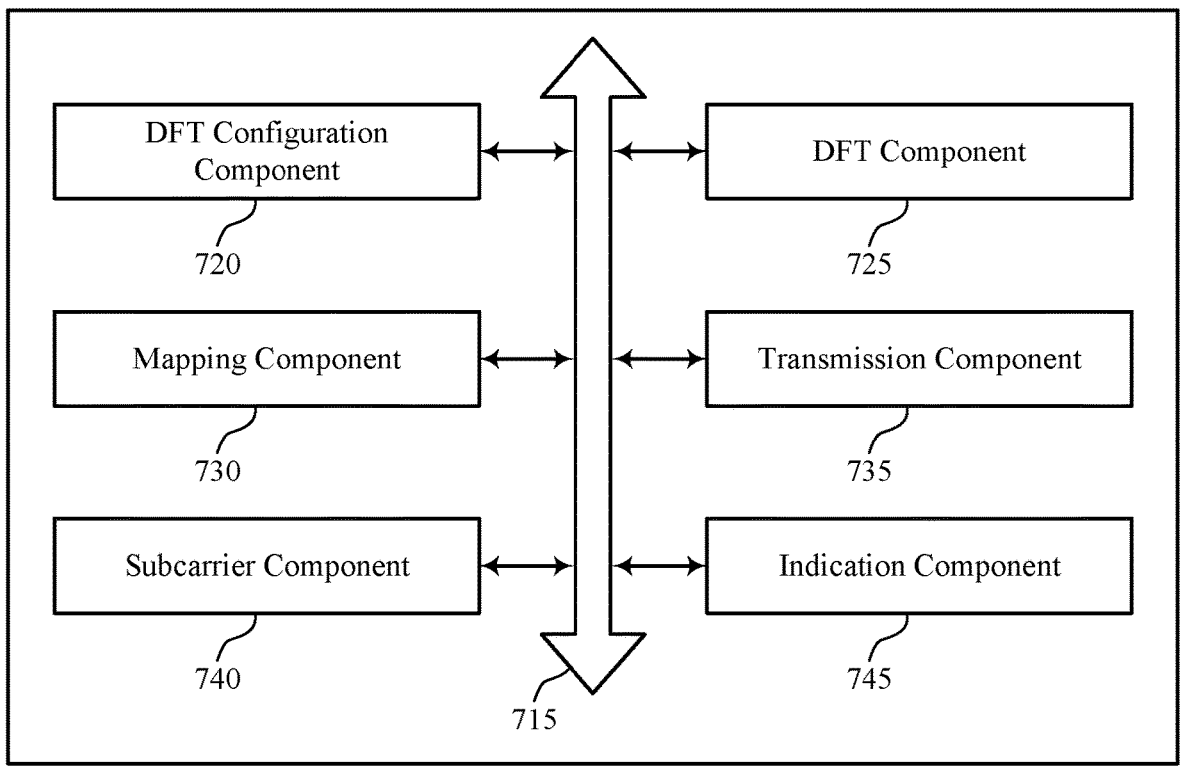

FIG. 7 shows a block diagram 700 of a base station communications manager 715 that supports a PT-RS for sub-symbol phase tracking in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include DFT configuration component 720, DFT component 725, mapping component 730, transmission component 735, subcarrier component 740, and indication component 745. Each of these modules may communicate, directly or indirectly, with one another (e.g., via one or more buses).

DFT configuration component 720 may determine a DFT configuration for a set of symbols. In some cases, determining the DFT configuration includes determining a number of DFT precoding units and a size of each DFT precoding unit. In some cases, determining the DFT configuration includes determining the DFT configuration based on an MCS, an SNR of at least one of the set of subcarriers, a phase noise associated with at least one of the set of subcarriers, a CFO associated with at least one of the set of subcarriers, or any combination thereof. In some cases, the set of symbols includes a set of PT-RS symbols. In some cases, each of the set of PT-RS symbols corresponds to a distinct PT-RS sequence.

DFT component 725 may generate, based on the DFT configuration, a set of DFT-precoded symbols corresponding to the set of symbols. In some cases, generating the set of DFT-precoded symbols includes generating a first subset of the set of DFT-precoded symbols using a first DFT precoding unit. In some cases, generating the set of DFT-precoded symbols includes accessing a lookup table that associates the set of symbols with the set of DFT-precoded symbols based on the DFT configuration, and retrieving the set of DFT-precoded symbols from memory.

Mapping component 730 may map the set of DFT-precoded symbols to a corresponding set of subcarriers, the set of subcarriers including at least a subset of subcarriers that are adjacent in frequency, and may map additional symbols to additional subcarriers. In some cases, mapping component 730 may map at least one of the additional symbols to a subcarrier within the wireless signal that is interposed in frequency between two of the set of subcarriers. In some cases, mapping the set of DFT-precoded symbols to the set of subcarriers includes mapping the first subset of the set of DFT-precoded symbols to the subset of subcarriers that are adjacent in frequency. In some cases, mapping the set of DFT-precoded symbols to the set of subcarriers includes mapping subsets of the set of DFT-precoded symbols to respective subsets of the set of subcarriers, where each subset of the set of DFT-precoded symbols is associated with a respective DFT precoding unit, and where each respective subset of the set of subcarriers includes subcarriers that are adjacent in frequency.

Transmission component 735 may cause a transmitter to transmit the set of DFT-precoded symbols via a wireless signal that includes the set of subcarriers and the additional subcarriers.

Subcarrier component 740 may determine the subcarriers to which DFT-precoded symbols and additional symbols are mapped. For example, subcarrier component 740 may receive, from a wireless device, channel quality information or signals to assist in determining channel quality information, and may determine, based on the channel quality information, at least one of the set of subcarriers. Subcarrier component 740 may also receive, from a wireless device, an indication of one or more preferred subcarriers, and determine, based on the indication, at least one of the set of subcarriers. In some cases, the channel quality information includes an SNR for at least one of the set of subcarriers.

Indication component 745 may cause a transmitter to transmit an indication of the DFT configuration, an indication of the set of subcarriers, or any combination thereof.

Figure 8:
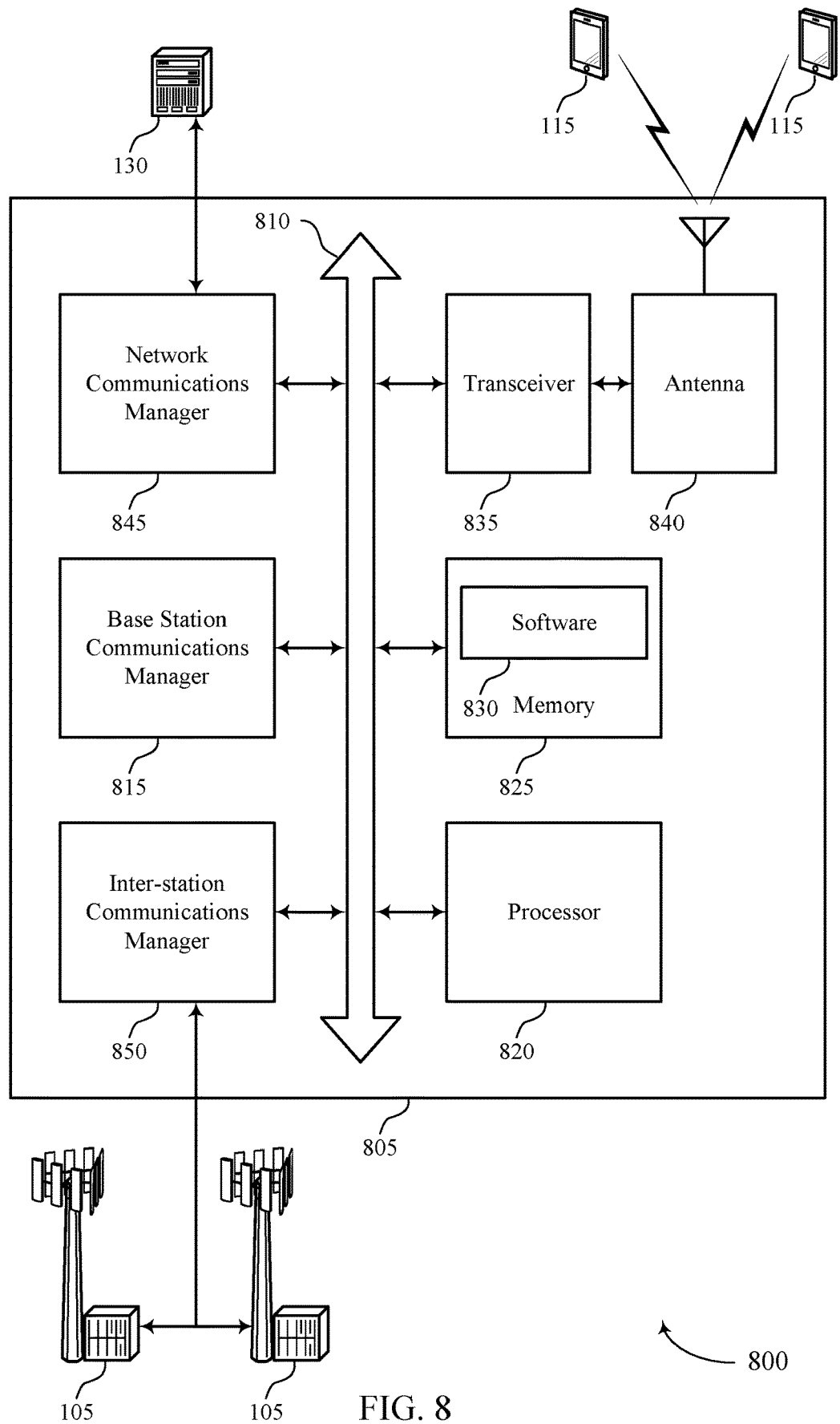
FIG. 8 illustrates a block diagram of a system including a base station that supports a PT-RS for sub-symbol phase tracking in accordance with aspects of the present disclosure.

FIG. 8 shows a diagram of a system 800 including a device 805 that supports a PT-RS for sub-symbol phase tracking in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more user equipment (UE)s 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting phase tracking reference signal for sub-symbol phase tracking).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support a phase tracking reference signal for sub-symbol phase tracking. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an Long Term Evolution (LTE)/LTE-A wireless communication network technology to provide communication between base stations 105.

Figure 9:
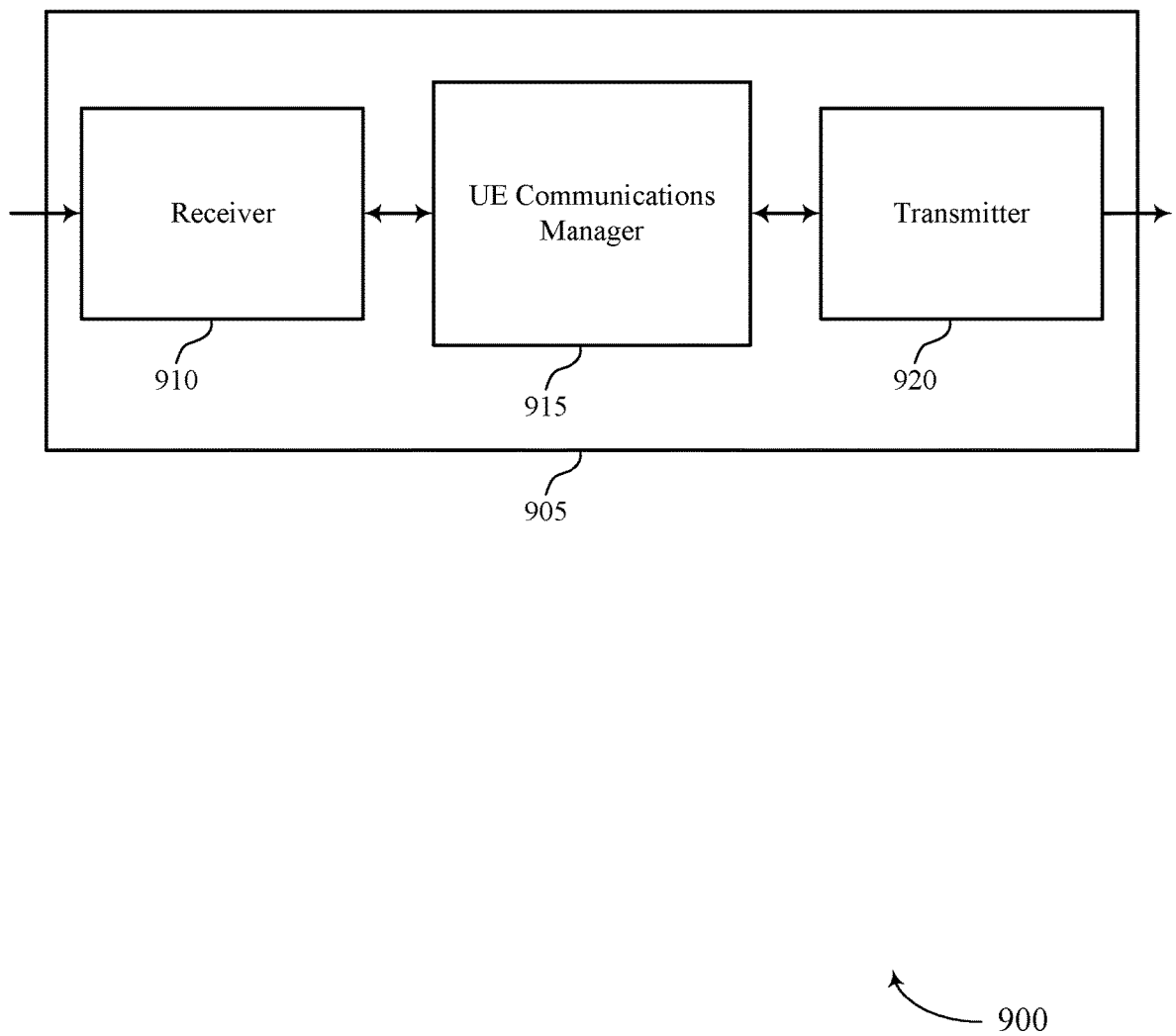
FIGS. 9 through 11 show block diagrams of a device that supports a PT-RS for sub-symbol phase tracking in accordance with aspects of the present disclosure.

FIG. 9 shows a block diagram 900 of a wireless device 905 that supports a PT-RS for sub-symbol phase tracking in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to phase tracking reference signal for sub-symbol phase tracking, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may identify a DFT configuration for a set of DFT-precoded symbols, receive the set of DFT-precoded symbols via a corresponding set of subcarriers within a wireless signal and additional symbols via additional subcarriers within the wireless signal, the set of subcarriers including at least a subset of subcarriers that are adjacent in frequency, estimate a phase error based on the set of DFT-precoded symbols and the DFT configuration, and apply a phase correction based on the phase error to the additional symbols.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
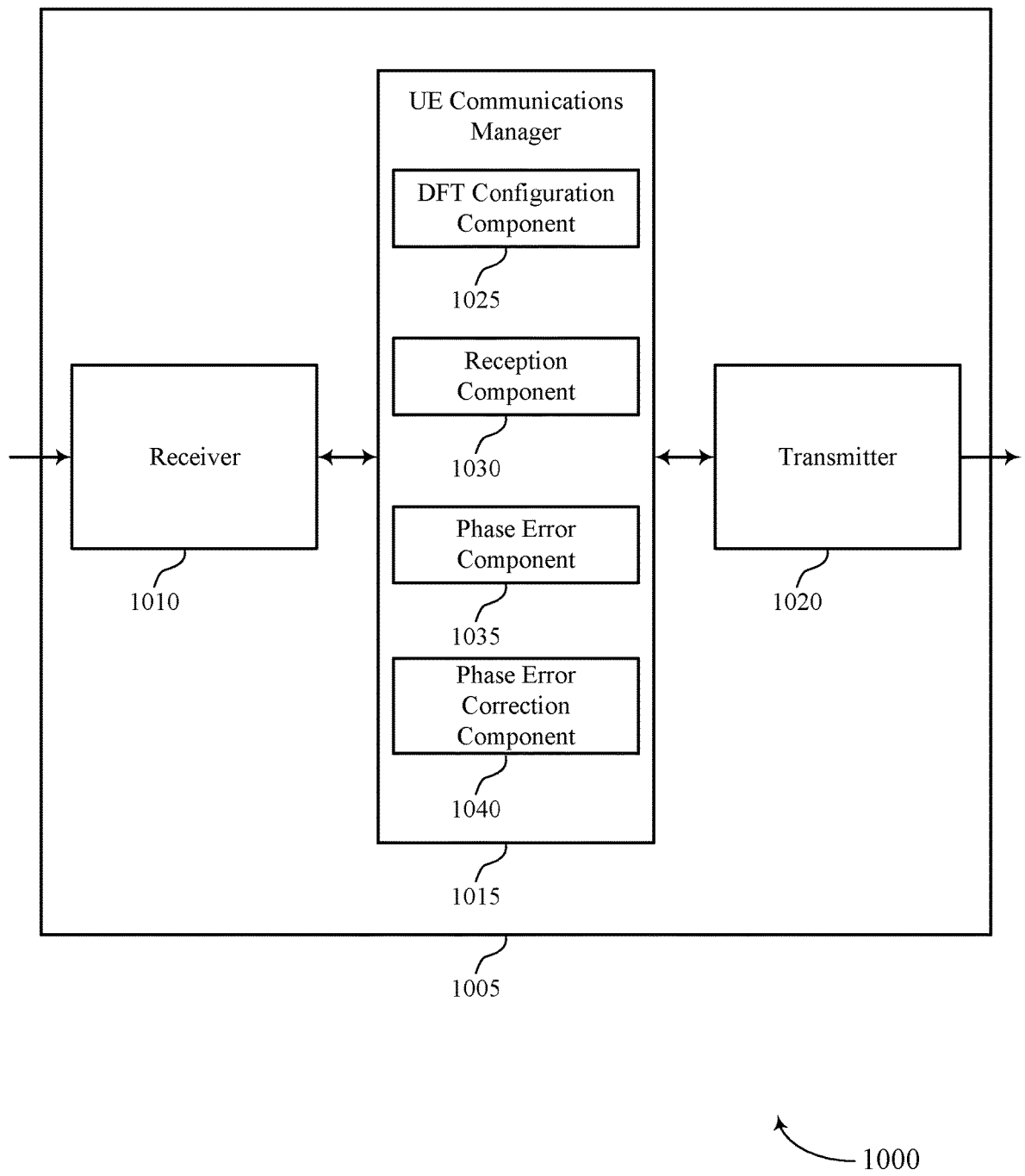

FIG. 10 shows a block diagram 1000 of a wireless device 1005 that supports a PT-RS for sub-symbol phase tracking in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to phase tracking reference signal for sub-symbol phase tracking, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include DFT configuration component 1025, reception component 1030, phase error component 1035, and phase error correction component 1040.

DFT configuration component 1025 may identify a DFT configuration for a set of DFT-precoded symbols. In some cases, identifying the DFT configuration includes receiving an indication of a number of DFT precoding units and a size of each DFT precoding unit. In some cases, DFT configuration component 1025 may cause the transmitter 1020 to transmit an indication of a preferred DFT configuration.

Reception component 1030 may receive the set of DFT-precoded symbols via a corresponding set of subcarriers within a wireless signal and additional symbols via additional subcarriers within the wireless signal, the set of subcarriers including at least a subset of subcarriers that are adjacent in frequency. In some cases, reception component 1030 may receive at least one of the additional symbols via a subcarrier within the wireless signal that is interposed in frequency between two of the set of subcarriers. In some cases, receiving the set of DFT-precoded symbols includes receiving subsets of the set of DFT-precoded symbols via respective subsets of the set of subcarriers, each subset of the set of DFT-precoded symbols associated with a respective DFT precoding unit, and each respective subset of the set of subcarriers including subcarriers that are adjacent in frequency. In some cases, the set of DFT-precoded symbols correspond to a set of PT-RS symbols. In some cases, each of the PT-RS symbols corresponds to a distinct PT-RS sequence.

Phase error component 1035 may estimate a phase error based on the set of DFT-precoded symbols and the DFT configuration. In some cases, estimating the phase error includes comparing the set of symbols to a corresponding set of reference symbols in the time domain. In some cases, estimating the phase error further includes computing a phase error trajectory for at least one of the set of subcarriers. In some cases, phase error component 1035 may receive an indication of the set of reference symbols.

Phase error correction component 1040 may apply a phase correction based on the phase error to the additional symbols. Phase error correction component 1040 may apply the phase correction in either the time domain or the frequency domain.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
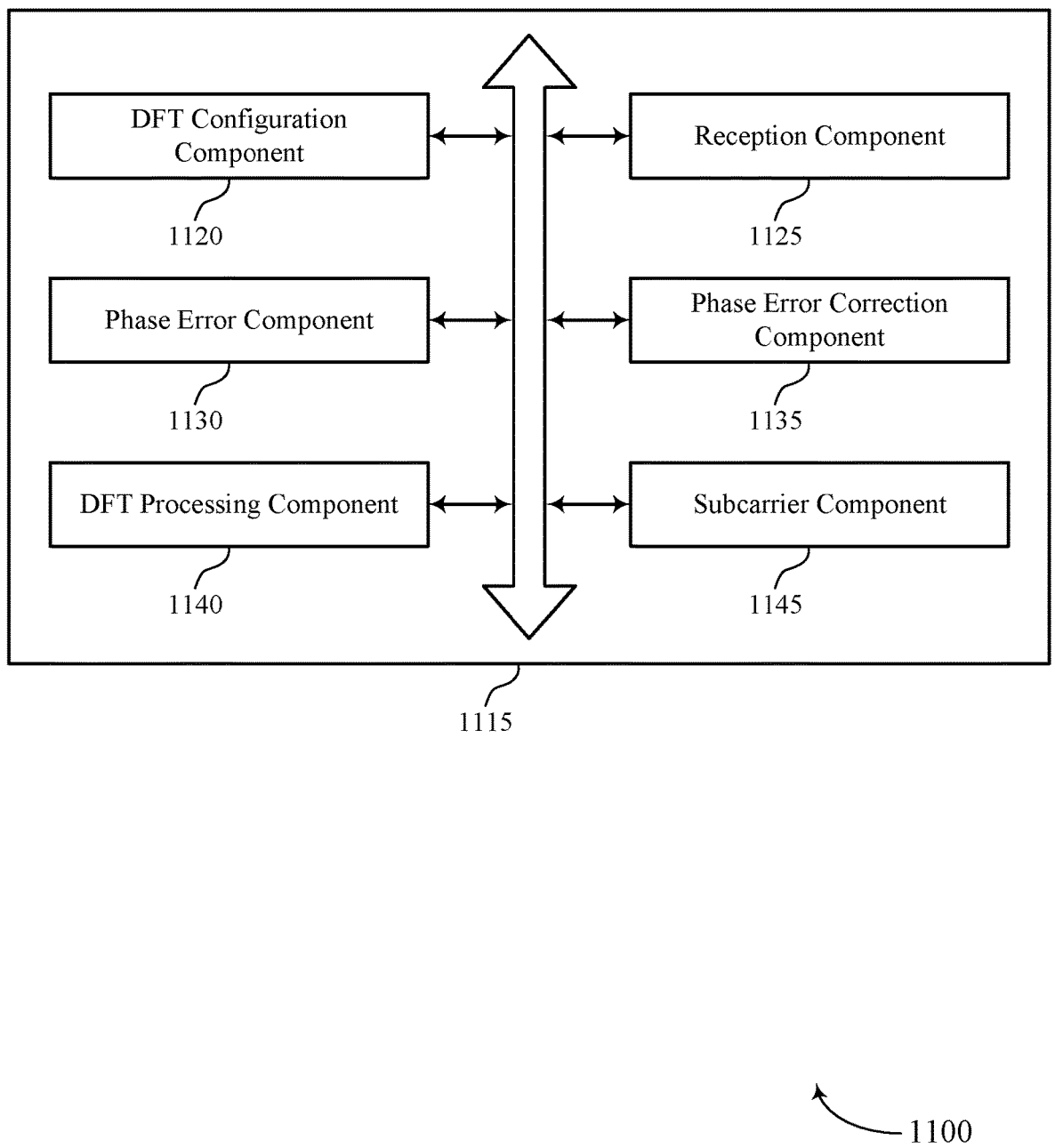

FIG. 11 shows a block diagram 1100 of a UE communications manager 1115 that supports a PT-RS for sub-symbol phase tracking in accordance with aspects of the present disclosure. The UE communications manager 1115 may be an example of aspects of a UE communications manager 1215 described with reference to FIGS. 9, 10, and 12. The UE communications manager 1115 may include DFT configuration component 1120, reception component 1125, phase error component 1130, phase error correction component 1135, DFT processing component 1140, and subcarrier component 1145. Each of these modules may communicate, directly or indirectly, with one another (e.g., via one or more buses).

DFT configuration component 1120 may identify a DFT configuration for a set of DFT-precoded symbols and transmit an indication of a preferred DFT configuration. In some cases, identifying the DFT configuration includes receiving an indication of a number of DFT precoding units and a size of each DFT precoding unit.

Reception component 1125 may receive the set of DFT-precoded symbols via a corresponding set of subcarriers within a wireless signal and additional symbols via additional subcarriers within the wireless signal, the set of subcarriers including at least a subset of subcarriers that are adjacent in frequency. In some cases, reception component 1125 may receive at least one of the additional symbols via a subcarrier within the wireless signal that is interposed in frequency between two of the set of subcarriers. In some cases, receiving the set of DFT-precoded symbols includes receiving subsets of the set of DFT-precoded symbols via respective subsets of the set of subcarriers, each subset of the set of DFT-precoded symbols associated with a respective DFT precoding unit, and each respective subset of the set of subcarriers including subcarriers that are adjacent in frequency. In some cases, the set of DFT-precoded symbols correspond to a set of PT-RS symbols. In some cases, each of the PT-RS symbols corresponds to a distinct PT-RS sequence.

Phase error component 1130 may estimate a phase error based on the set of DFT-precoded symbols and the DFT configuration. In some cases, estimating the phase error includes comparing the set of symbols to a corresponding set of reference symbols in the time domain. In some cases, phase error component 1130 may receive an indication of the set of reference symbols. In some cases, estimating the phase error further includes computing a phase error trajectory for at least one of the set of subcarriers.

Phase error correction component 1135 may apply a phase correction based on the phase error to the additional symbols. Phase error correction component 1135 may apply the phase correction in either the time domain or the frequency domain.

DFT processing component 1140 may process the set of DFT-precoded symbols based on the DFT configuration to obtain a corresponding set of symbols. In some cases, processing the set of DFT-precoded symbols includes applying an inverse DFT (IDFT) to the set of DFT-precoded symbols. In some cases, processing the set of DFT-precoded symbols includes accessing a lookup table that associates the set of symbols with the set of DFT-precoded symbols based on the DFT configuration, and retrieving the set of symbols from memory.

Subcarrier component 1145 may transmit an indication of a preferred subcarrier, and may receive an indication of the set of subcarriers. Subcarrier component 1145 may determine the preferred subcarrier based on an SNR.

Figure 12:
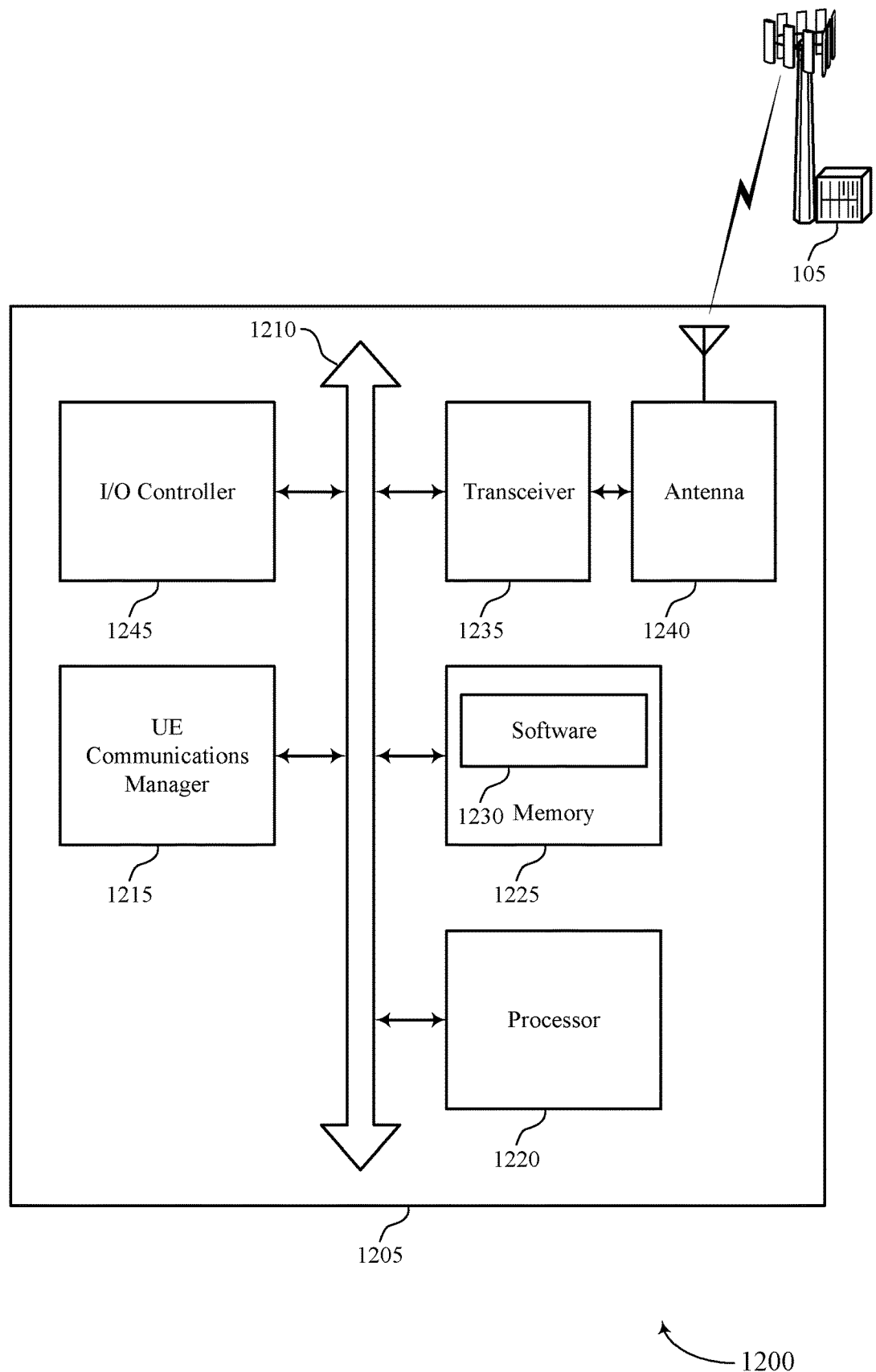
FIG. 12 illustrates a block diagram of a system including a UE that supports a PT-RS for sub-symbol phase tracking in accordance with aspects of the present disclosure.

FIG. 12 shows a diagram of a system 1200 including a device 1205 that supports a PT-RS for sub-symbol phase tracking in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting phase tracking reference signal for sub-symbol phase tracking).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support a phase tracking reference signal for sub-symbol phase tracking. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
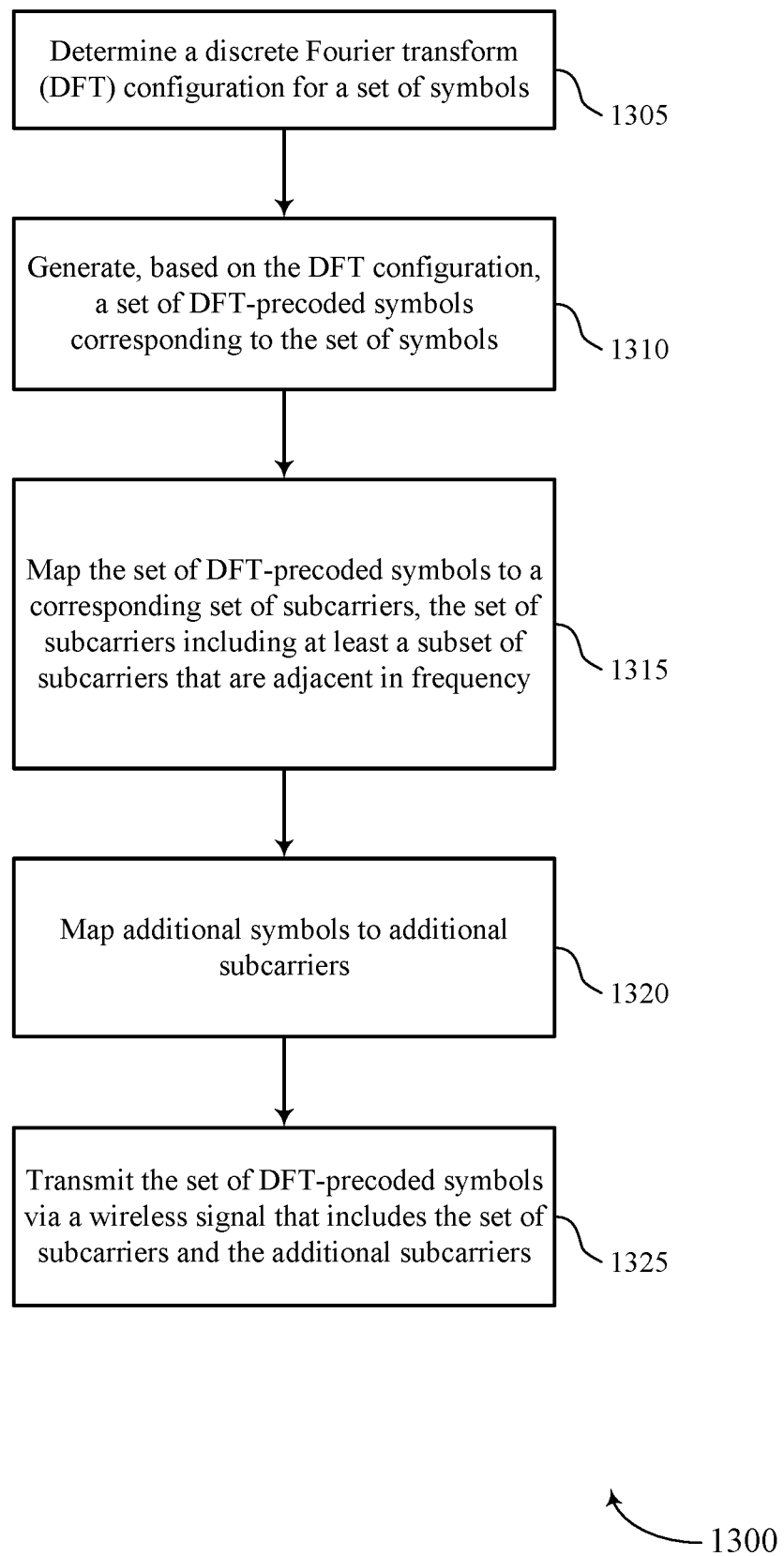
FIGS. 13 through 14 illustrate methods for phase tracking reference signal for sub-symbol phase tracking in accordance with aspects of the present disclosure.

FIG. 13 shows a flowchart illustrating a method 1300 for phase tracking reference signal for sub-symbol phase tracking in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware. In some examples, the operations of method 1300 or other aspects nominally ascribed to a base station 105 herein may be performed by any transmitting node (e.g., by a UE 115), which may include structures and components or otherwise support functions ascribed herein to a base station 105.

At 1305 the base station 105 may determine a DFT configuration for a plurality of symbols. The operations of 1305 may be performed according to the methods described herein. In certain examples, aspects of the operations of 1305 may be performed by a DFT configuration component as described with reference to FIGS. 5 through 8.

At 1310 the base station 105 may generate, based at least in part on the DFT configuration, a plurality of DFT-precoded symbols corresponding to the plurality of symbols. The operations of 1310 may be performed according to the methods described herein. In certain examples, aspects of the operations of 1310 may be performed by a DFT component as described with reference to FIGS. 5 through 8.

At 1315 the base station 105 may map the plurality of DFT-precoded symbols to a corresponding plurality of subcarriers, the plurality of subcarriers including at least a subset of subcarriers that are adjacent in frequency. The operations of 1315 may be performed according to the methods described herein. In certain examples, aspects of the operations of 1315 may be performed by a mapping component as described with reference to FIGS. 5 through 8.

At 1320 the base station 105 may map additional symbols to additional subcarriers. The operations of 1320 may be performed according to the methods described herein. In certain examples, aspects of the operations of 1320 may be performed by a mapping component as described with reference to FIGS. 5 through 8.

At 1325 the base station 105 may transmit the plurality of DFT-precoded symbols via a wireless signal that includes the plurality of subcarriers and the additional subcarriers. The operations of 1325 may be performed according to the methods described herein. In certain examples, aspects of the operations of 1325 may be performed by a transmission component as described with reference to FIGS. 5 through 8.

Aspects of method 1300 may provide for techniques to address identifying and correcting phase errors at wireless devices. Phase errors in a wireless system may be due to various factors including phase noise, carrier frequency offset, or Doppler effect, as a receiver and a transmitter may move relative to one another. To ameliorate these issues, various techniques at wireless devices may be utilized. For example, a base station may frequency division multiplex DFT-precoded symbols with other symbols and transmit the frequency division multiplexed symbols to a UE. A UE (or other receiving device, such as another base station) may receive the wireless signal and estimate a phase error based at least in part on the DFT-precoded symbols.

Figure 14:
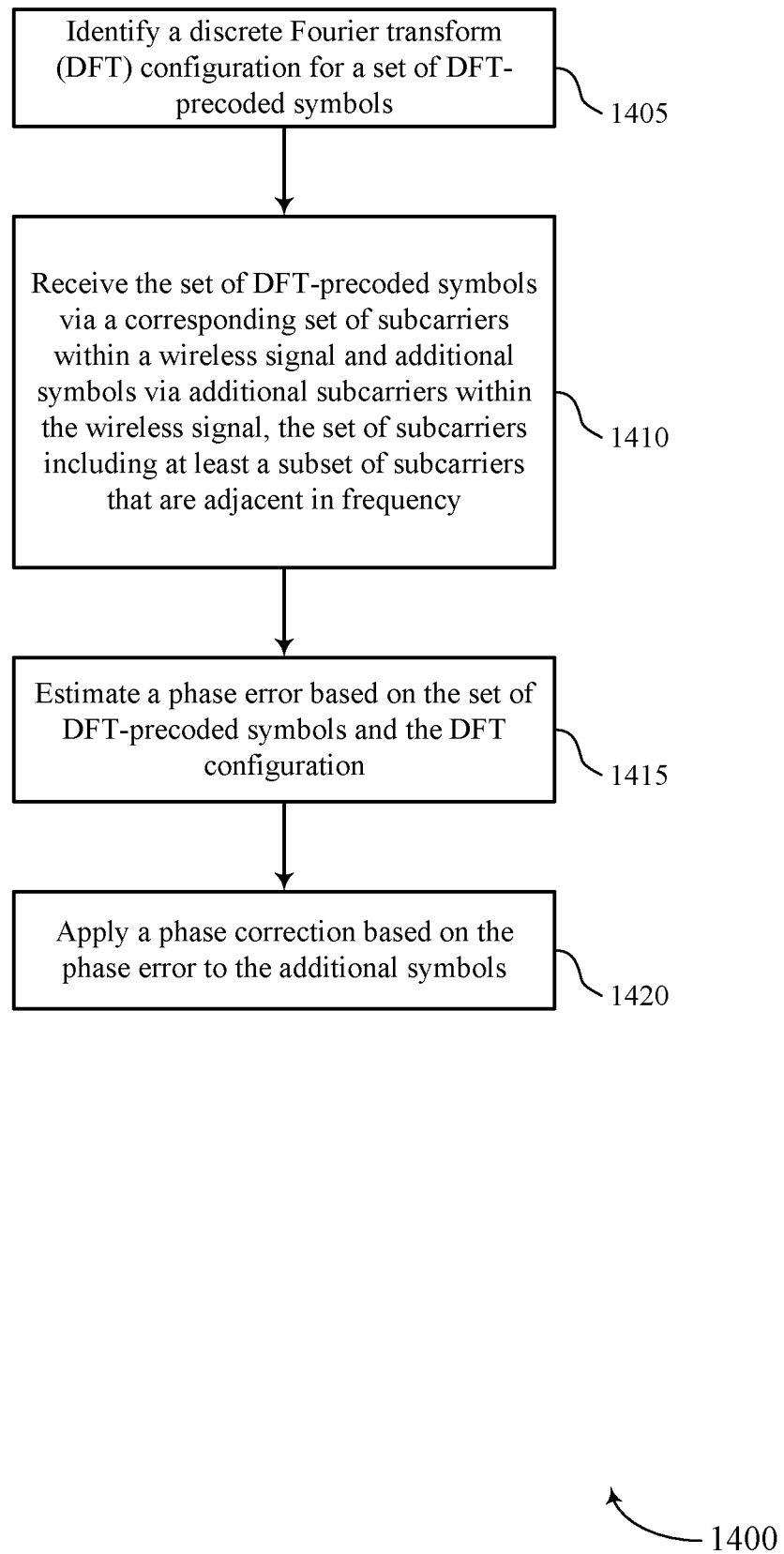

FIG. 14 shows a flowchart illustrating a method 1400 for phase tracking reference signal for sub-symbol phase tracking in accordance with aspects of the present disclosure. The operations of method 1400 may be implemented by a UE 115 or its components as described herein. For example, the operations of method 1400 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware. In some examples, the operations of method 1400 or other aspects nominally ascribed to a UE 115 herein may be performed by any receiving node (e.g., by a base station 105), which may include structures and components or otherwise support functions ascribed herein to a UE 115.

At 1405 the UE 115 may identify a DFT configuration for a plurality of DFT-precoded symbols. The operations of 1405 may be performed according to the methods described herein. In certain examples, aspects of the operations of 1405 may be performed by a DFT configuration component as described with reference to FIGS. 9 through 12.

At 1410 the UE 115 may receive the plurality of DFT-precoded symbols via a corresponding plurality of subcarriers within a wireless signal and additional symbols via additional subcarriers within the wireless signal, the plurality of subcarriers including at least a subset of subcarriers that are adjacent in frequency. The operations of 1410 may be performed according to the methods described herein. In certain examples, aspects of the operations of 1410 may be performed by a reception component as described with reference to FIGS. 9 through 12.

At 1415 the UE 115 may estimate a phase error based at least in part on the plurality of DFT-precoded symbols and the DFT configuration. The operations of 1415 may be performed according to the methods described herein. In certain examples, aspects of the operations of 1415 may be performed by a phase error component as described with reference to FIGS. 9 through 12.

At 1420 the UE 115 may apply a phase correction based at least in part on the phase error to the additional symbols. The operations of 1420 may be performed according to the methods described herein. In certain examples, aspects of the operations of 1420 may be performed by a phase error correction component as described with reference to FIGS. 9 through 12.

Aspects of method 1400 may provide for techniques to address identifying and correcting phase errors at wireless devices. Phase errors in a wireless system may be due to various factors including phase noise, carrier frequency offset, or Doppler effect, as a receiver and a transmitter may move relative to one another. To ameliorate these issues, various techniques at wireless devices may be utilized. For example, a base station may frequency division multiplex DFT-precoded symbols with other symbols and transmit the frequency division multiplexed symbols to a UE. A UE (or other receiving device, such as another base station) may receive the wireless signal and estimate a phase error based at least in part on the DFT-precoded symbols.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a discrete Fourier transform (DFT) configuration for a plurality of DFT-precoded symbols;
   receiving the plurality of DFT-precoded symbols via a corresponding plurality of subcarriers within a wireless signal and non-DFT precoded symbols via additional subcarriers apart from the plurality of subcarriers within the wireless signal, the plurality of subcarriers including at least a subset of subcarriers that are adjacent in frequency;
   estimating a phase error based at least in part on the plurality of DFT-precoded symbols and the DFT configuration; and
   applying a phase correction based at least in part on the phase error to the non-DFT precoded symbols.

2. The method of claim 1, further comprising:
   processing the plurality of DFT-precoded symbols based at least in part on the DFT configuration to obtain a corresponding plurality of symbols.

3. The method of claim 2, wherein estimating the phase error comprises:
comparing the plurality of symbols to a corresponding plurality of reference symbols in the time domain.

4. The method of claim 3, further comprising:
receiving an indication of the plurality of reference symbols.

5. The method of claim 3, wherein estimating the phase error further comprises:
computing a phase error trajectory for at least one of the plurality of subcarriers.

6. The method of claim 2, wherein processing the plurality of DFT-precoded symbols comprises:
applying an inverse DFT (IDFT) to the plurality of DFT-precoded symbols.

7. The method of claim 2, wherein processing the plurality of DFT-precoded symbols comprises:
accessing a lookup table that associates the plurality of symbols with the plurality of DFT-precoded symbols based at least in part on the DFT configuration; and
retrieving the plurality of symbols from memory.

8. The method of claim 1, further comprising:
transmitting an indication of a preferred subcarrier.

9. The method of claim 1, further comprising:
transmitting an indication of a preferred DFT configuration.

10. The method of claim 1, wherein identifying the DFT configuration comprises:
receiving an indication of a number of DFT precoding units and a size of each DFT precoding unit.

11. The method of claim 1, further comprising:
receiving an indication of the plurality of subcarriers.

12. The method of claim 1, wherein applying the phase correction to the non-DFT precoded symbols occurs in either the time domain or the frequency domain.

13. The method of claim 1, further comprising:
receiving at least one of the non-DFT precoded symbols via a subcarrier within the wireless signal that is interposed in frequency between two of the plurality of subcarriers.

14. The method of claim 1, wherein receiving the plurality of DFT-precoded symbols comprises:
receiving subsets of the plurality of DFT-precoded symbols via respective subsets of the plurality of subcarriers, each subset of the plurality of DFT-precoded symbols associated with a respective DFT precoding unit, and each respective subset of the plurality of subcarriers comprising subcarriers that are adjacent in frequency.

15. The method of claim 1, wherein the plurality of DFT-precoded symbols correspond to a plurality of phase tracking reference signal (PT-RS) symbols.

16. The method of claim 15, wherein each of the plurality of PT-RS symbols corresponds to a distinct PT-RS sequence.

17. An apparatus for wireless communication, comprising:
a processor;
memory coupled to the processor; and
instructions stored in the memory and executable by the processor to cause the apparatus to:
identify a discrete Fourier transform (DFT) configuration for a plurality of DFT-precoded symbols;
receive the plurality of DFT-precoded symbols via a corresponding plurality of subcarriers within a wireless signal and non-DFT precoded symbols via additional subcarriers apart from the plurality of subcarriers within the wireless signal, the plurality of subcarriers including at least a subset of subcarriers that are adjacent in frequency;
estimate a phase error based at least in part on the plurality of DFT-precoded symbols and the DFT configuration; and
apply a phase correction based at least in part on the phase error to the non-DFT precoded symbols.

18. The apparatus of claim 17, wherein the instructions are further executable by the processor to cause the apparatus to:
process the plurality of DFT-precoded symbols based at least in part on the DFT configuration to obtain a corresponding plurality of symbols.

19. The apparatus of claim 18, wherein the instructions to estimate the phase error are executable by the processor to further cause the apparatus to:
compare the plurality of symbols to a corresponding plurality of reference symbols in the time domain.

20. The apparatus of claim 19, wherein the instructions are further executable by the processor to cause the apparatus to:
receive an indication of the plurality of reference symbols.

21. The apparatus of claim 19, wherein the instructions to estimate the phase error are executable by the processor to further cause the apparatus to:
compute a phase error trajectory for at least one of the plurality of subcarriers.

22. The apparatus of claim 18, wherein the instructions to process the plurality of DFT-precoded symbols are executable by the processor to further cause the apparatus to:
apply an inverse DFT (IDFT) to the plurality of DFT-precoded symbols.

23. The apparatus of claim 18, wherein the instructions to process the plurality of DFT-precoded symbols are executable by the processor to further cause the apparatus to:
access a lookup table that associates the plurality of symbols with the plurality of DFT-precoded symbols based at least in part on the DFT configuration; and
retrieve the plurality of symbols from memory.

24. The apparatus of claim 17, wherein the instructions are further executable by the processor to cause the apparatus to:
transmit an indication of a preferred DFT configuration.

25. The apparatus of claim 17, wherein the instructions to identify the DFT configuration are executable by the processor to further cause the apparatus to:
receive an indication of a number of DFT precoding units and a size of each DFT precoding unit.

26. The apparatus of claim 17, wherein the instructions are further executable by the processor to cause the apparatus to:
receive at least one of the non-DFT precoded symbols via a subcarrier within the wireless signal that is interposed in frequency between two of the plurality of subcarriers.

27. The apparatus of claim 17, wherein the instructions to receive the plurality of DFT-precoded symbols are executable by the processor to further cause the apparatus to:
receive subsets of the plurality of DFT-precoded symbols via respective subsets of the plurality of subcarriers, each subset of the plurality of DFT-precoded symbols associated with a respective DFT precoding unit, and each respective subset of the plurality of subcarriers comprising subcarriers that are adjacent in frequency.

28. The apparatus of claim 17, wherein the plurality of DFT-precoded symbols correspond to a plurality of phase tracking reference signal (PT-RS) symbols.

29. An apparatus for wireless communication, comprising:
- means for identifying a discrete Fourier transform (DFT) configuration for a plurality of DFT-precoded symbols;
- means for receiving the plurality of DFT-precoded symbols via a corresponding plurality of subcarriers within a wireless signal and non-DFT precoded symbols via additional subcarriers apart from the plurality of subcarriers within the wireless signal, the plurality of subcarriers including at least a subset of subcarriers that are adjacent in frequency;
- means for estimating a phase error based at least in part on the plurality of DFT-precoded symbols and the DFT configuration; and
- means for applying a phase correction based at least in part on the phase error to the non-DFT precoded symbols.

30. A non-transitory computer-readable medium storing code for wireless communications, the code comprising instructions executable by a processor to:
- identify a discrete Fourier transform (DFT) configuration for a plurality of DFT-precoded symbols;
- receive the plurality of DFT-precoded symbols via a corresponding plurality of subcarriers within a wireless signal and non-DFT precoded symbols via additional subcarriers apart from the plurality of subcarriers within the wireless signal, the plurality of subcarriers including at least a subset of subcarriers that are adjacent in frequency;
- estimate a phase error based at least in part on the plurality of DFT-precoded symbols and the DFT configuration; and
- apply a phase correction based at least in part on the phase error to the non-DFT precoded symbols.

* * * * *